US011101475B2

(12) United States Patent
Zilberman et al.

(10) Patent No.: US 11,101,475 B2
(45) Date of Patent: Aug. 24, 2021

(54) SYSTEM FOR HYDROGEN LIQUID CARRIER STORAGE

(71) Applicant: ELECTRIQ-GLOBAL ENERGY SOLUTIONS LTD., Tirat Carmel (IL)

(72) Inventors: Alexander Zilberman, Haifa (IL); Guy Nevo-Michrowski, Kadima Tzoran (IL); Denis Ginzburg, Kadima Tzoran (IL)

(73) Assignee: ELECTRIQ-GLOBAL ENERGY SOLUTIONS LTD., Tirat Carmel (IL)

( * ) Notice: Subject to any disclaimer, the term of this patent is extended or adjusted under 35 U.S.C. 154(b) by 31 days.

(21) Appl. No.: 16/277,176

(22) Filed: Feb. 15, 2019

(65) Prior Publication Data

US 2019/0316735 A1 Oct. 17, 2019

Related U.S. Application Data

(60) Provisional application No. 62/723,331, filed on Aug. 27, 2018, provisional application No. 62/658,635, filed on Apr. 17, 2018.

(51) Int. Cl.
*H01M 8/04082* (2016.01)
*F17C 11/00* (2006.01)
(Continued)

(52) U.S. Cl.
CPC ..... *H01M 8/04208* (2013.01); *B01J 27/1853* (2013.01); *C01B 3/065* (2013.01);
(Continued)

(58) Field of Classification Search
CPC ........... H01M 8/04201; H01M 8/04208; F17C 2201/018; F17C 2270/0184
See application file for complete search history.

(56) References Cited

U.S. PATENT DOCUMENTS 6,534,033 B1 3/2003 Amendola et al.
6,755,219 B1 6/2004 Bolle
(Continued)

FOREIGN PATENT DOCUMENTS

EP 3006803 9/2017
ES 2387171 8/2013
(Continued)

OTHER PUBLICATIONS

International Search Report and Written Opinion dated Aug. 13, 2019, in International Application No. PCT/IB2019/000148 (14 pgs.).

*Primary Examiner* — Kevin F Murphy
(74) *Attorney, Agent, or Firm* — Finnegan, Henderson, Farabow, Garrett & Dunner, LLP

(57) ABSTRACT

A fuel tank for storing a hydrogen liquid carrier and a spent hydrogen liquid carrier includes a substantially rigid exterior tank wall including a first chamber and a second chamber. The first chamber is fluidly disconnected from the second chamber, and the second chamber includes a dynamically expandable and contractible enclosure, the enclosure being configured to define a dynamic boundary between the hydrogen liquid carrier and spent hydrogen liquid carrier. The fuel tank also includes a first channel in flow communication with one of the first chamber or the second chamber and a second channel in flow communication with another of the first chamber or the second chamber, wherein the first channel and the second channel are flow connected such that a flow through one of the first or second channels is returned to the another of the first or second channels, and that during the flow, the dynamic boundary changes position causing a change in a volume of the second chamber.

20 Claims, 15 Drawing Sheets

(51) Int. Cl.
*C01B 3/06* (2006.01)
*C01B 3/32* (2006.01)
*B01J 27/185* (2006.01)
*H01M 4/90* (2006.01)
*H01M 8/065* (2016.01)

(52) U.S. Cl.
CPC .............. *C01B 3/32* (2013.01); *F17C 11/005* (2013.01); *H01M 4/90* (2013.01); *H01M 8/04201* (2013.01); *H01M 8/04216* (2013.01); *H01M 8/065* (2013.01); *B01J 2523/305* (2013.01); *B01J 2523/51* (2013.01); *B01J 2523/845* (2013.01); *B01J 2523/847* (2013.01); *F17C 2201/018* (2013.01); *F17C 2221/012* (2013.01); *F17C 2270/0184* (2013.01); *H01M 2220/20* (2013.01); *H01M 2250/20* (2013.01)

(56) References Cited

U.S. PATENT DOCUMENTS

| | | | |
|---|---|---|---|
| 6,932,847 B2 | 8/2005 | Amendola et al. | |
| 7,097,813 B2 | 8/2006 | Ord et al. | |
| 7,172,825 B2* | 2/2007 | Adams | F16K 24/06 |
| | | | 429/443 |
| 7,220,290 B2 | 5/2007 | Amendola et al. | |
| 7,270,907 B2* | 9/2007 | Becerra | H01M 8/02 |
| | | | 220/530 |
| 7,316,718 B2 | 1/2008 | Amendola et al. | |
| 7,530,931 B2 | 5/2009 | Amendola et al. | |
| 7,540,892 B2 | 6/2009 | Strizki et al. | |
| 7,585,338 B2 | 9/2009 | Yoshizaki | |
| 7,674,540 B2 | 3/2010 | Adams et al. | |
| 7,779,856 B2* | 8/2010 | Adams | H01M 8/04208 |
| | | | 137/210 |
| 8,021,793 B2* | 9/2011 | Nakai | H01M 8/065 |
| | | | 429/416 |
| 8,408,246 B2* | 4/2013 | Adams | B01D 19/0005 |
| | | | 137/563 |
| 8,506,659 B2 | 8/2013 | Ord et al. | |
| 8,530,102 B2 | 9/2013 | Sarata et al. | |
| 8,746,274 B2* | 6/2014 | Izutani | C01B 3/00 |
| | | | 137/334 |
| 8,764,858 B2 | 7/2014 | Barton et al. | |
| 8,821,834 B2 | 9/2014 | Curello et al. | |
| 9,102,528 B2 | 8/2015 | Wallace et al. | |
| 9,266,727 B2 | 2/2016 | Stimits et al. | |
| 9,669,371 B2 | 6/2017 | Wallace et al. | |
| 9,845,239 B2 | 12/2017 | Wallace et al. | |
| 2003/0037487 A1 | 2/2003 | Amendola et al. | |
| 2003/0082427 A1 | 5/2003 | Prasad et al. | |
| 2007/0077480 A1* | 4/2007 | Curello | H01M 8/04208 |
| | | | 44/457 |
| 2007/0172403 A1 | 7/2007 | Lim et al. | |
| 2008/0052994 A1 | 3/2008 | Nojima et al. | |
| 2008/0085431 A1* | 4/2008 | Kohno | H01M 8/04194 |
| | | | 429/414 |
| 2008/0113249 A1* | 5/2008 | Bae | H01M 8/04186 |
| | | | 429/410 |
| 2010/0196769 A1* | 8/2010 | Na | H01M 8/0662 |
| | | | 429/415 |

FOREIGN PATENT DOCUMENTS

| | | |
|---|---|---|
| JP | 4899474 | 3/2012 |
| JP | 2013193937 | 9/2013 |
| WO | WO2017/127022 | 7/2017 |

* cited by examiner

Pillow like bladder (for DGS to redraw, preferably in both compressed and expanded view)

SYSTEM FOR HYDROGEN LIQUID CARRIER STORAGE

CROSS REFERENCE TO RELATED APPLICATIONS

This application claims the benefit of U.S. Provisional Application No. 62/658,635, filed on Apr. 17, 2018, and U.S. Provisional Application No. 62/723,331 filed on Aug. 27, 2018. Each of the foregoing applications is incorporated herein by reference in its entirety.

TECHNICAL FIELD

The present invention generally relates to a system for storing a hydrogen liquid carrier and related chemical compounds. In particular, the present invention relates to a system for storing a hydrogen liquid carrier and a spent hydrogen liquid carrier resulting from a process for releasing hydrogen from the hydrogen liquid carrier.

BACKGROUND

With the limited supply of fossil fuels and their adverse effect on the climate and the environment, it has become a global priority to seek alternate sources of energy that are clean, abundant, and sustainable. While sources such as solar, wind, and hydrogen can meet the world's energy demand, considerable challenges remain to find materials that can store and/or convert energy efficiently.

Hydrogen has the highest energy per mass of any fuel. Its low ambient temperature density, however, results in a low energy per unit volume, therefore requiring the development of advanced storage methods that have the potential for higher energy density. Hydrogen is considered to be an ideal fuel for the transportation industry. However, considerable challenges related to hydrogen generation from a hydrogen liquid carrier still need to be addressed in order to use hydrogen for transportation purposes.

At ambient conditions, hydrogen is a volatile gas. One kg of hydrogen occupies 11 m$^3$ (~100 g/m$^3$)—a volume that may be impractically large for certain hydrogen-based energy applications. One goal in hydrogen utilization, therefore, is the reduction of hydrogen volume, either by compression, liquefaction, adsorption to high surface area materials, or embedding in solid compounds. Solid state hydrogen storage may result in the highest hydrogen volumetric densities, exceeding a volumetric density of liquid hydrogen, for example, by more than a factor of two. Other challenges from the materials perspective may include combined volumetric and gravimetric hydrogen density that may be required for use in the transportation industry (e.g., 5.5 mass % H$_2$ and 40 kg/m$^3$ of H$_2$ respectively), suitable thermodynamic stability for the working temperature (e.g., −40 to 85° C.), and sufficiently fast reaction kinetics to allow rapid hydrogen uptake and delivery (e.g., refueling of 5 kg of H$_2$ in few minutes).

For at least these reasons, hydrogen storage is a key enabling technology for the advancement of hydrogen and fuel cell technologies in applications including stationary power, portable power, and transportation, such as metal borohydrides, may offer a hydrogen storage medium. Metal borohydrides may be dissolved in a liquid, such as water, resulting in a hydrogen liquid carrier. Metal borohydrides may be capable of storing hydrogen at targets levels from 4 wt % H$_2$ and 40 g of H$_2$ per liter to 8 wt % H$_2$ and 80 g of H$_2$ per liter of the hydrogen liquid carrier. Under appropriate temperature and pressure conditions, metal borohydrides may release hydrogen that can be used as a fuel (e.g., for a fuel cell).

The presently disclosed embodiments may address the storage challenges of hydrogen-based energy systems. The disclosed embodiments include storage solutions for the hydrogen liquid carrier, as well as solutions for storage of various chemical compounds and byproducts related to the processes for releasing hydrogen from the hydrogen liquid carrier, for example.

SUMMARY

Consistent with a disclosed embodiment, a fuel tank for storing a hydrogen liquid carrier (also referred to as a carrier) and a spent hydrogen liquid carrier (also referred to as a spent carrier) is provided. The fuel tank may include a substantially rigid exterior tank wall including a first chamber and a second chamber. The first chamber may be fluidly disconnected from the second chamber, and the second chamber may include a dynamically expandable and contractible enclosure, the enclosure being configured to define a dynamic boundary between the hydrogen liquid carrier and spent hydrogen liquid carrier. The fuel tank may also include a first channel in flow communication with one of the first chamber or the second chamber and a second channel in flow communication with another of the first chamber or the second chamber, wherein the first channel and the second channel are flow connected such that a flow through one of the first or second channels is returned to the another of the first or second channels, and that during the flow, the dynamic boundary changes position causing a change in a volume of the second chamber.

Consistent with another disclosed embodiment, a system for storing a hydrogen liquid carrier and a spent hydrogen liquid carrier is provided. The system may include a first chamber partially positioned within a second chamber, the first chamber being a dynamically expandable and contractible bladder, the bladder being configured to define a dynamic boundary between the first chamber and the second chamber. The system may further include a first carrier channel in flow communication with the first chamber, a second carrier channel in flow communication with the second chamber, a first gas channel in flow communication with the first chamber; and a second gas channel in flow communication with the second chamber.

Consistent with another disclosed embodiment, a system for storing a concentrated hydrogen liquid carrier and a spent hydrogen liquid carrier is provided. The system may include a first chamber partially positioned within a second chamber, the first chamber being a dynamically expandable and contractible bladder being configured to define a dynamic boundary between the first chamber and the second chamber. The system may further include a first carrier channel in flow communication with the first chamber, a second carrier channel in flow communication with the second chamber, a carrier chamber including the concentrated hydrogen liquid carrier, and a liquid containing chamber.

The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, the emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

Figure 1:
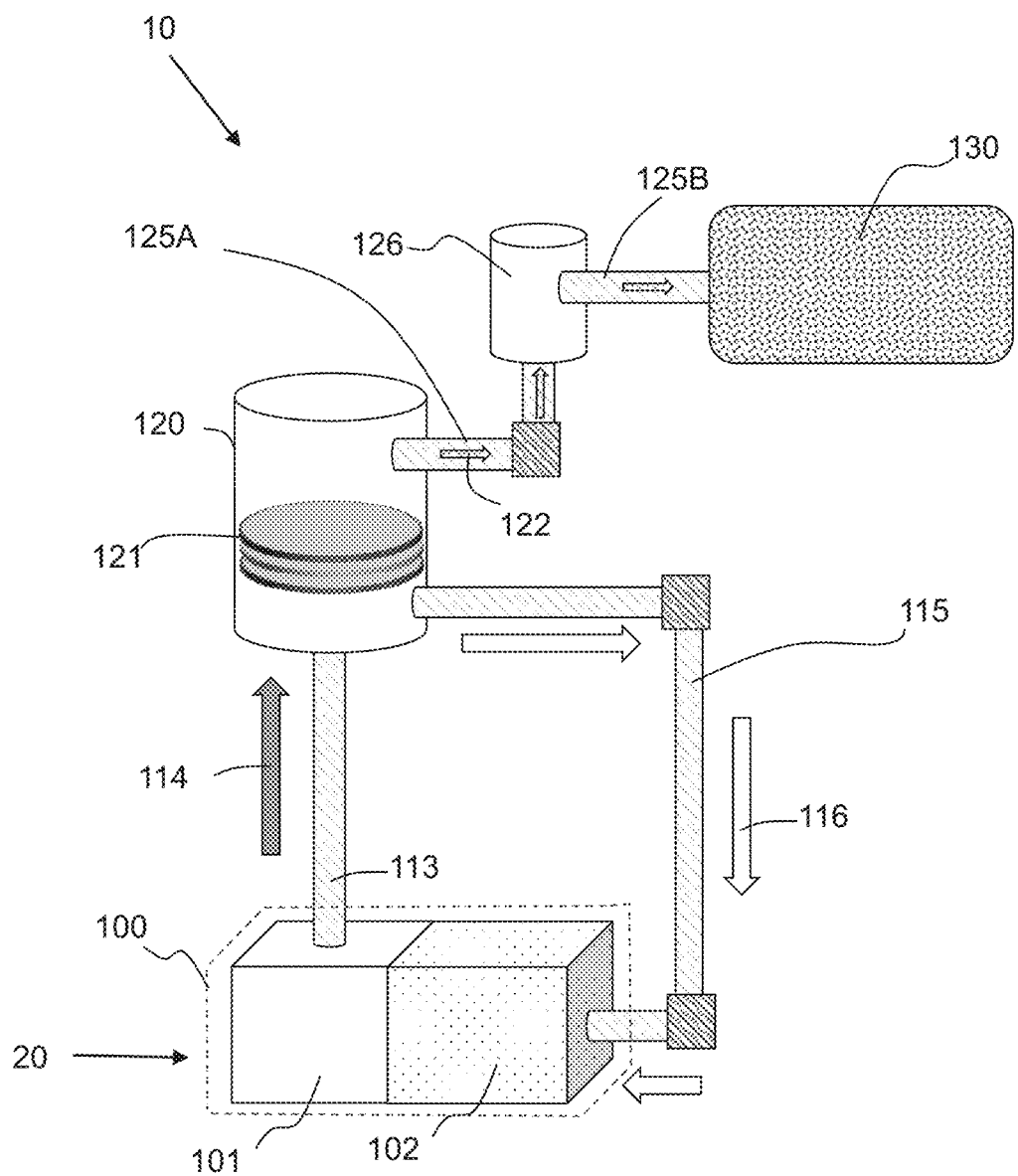
FIG. 1 is an illustrative system for hydrogen generation consistent with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

In various embodiments of the present invention, a system for storing a hydrogen liquid carrier and related chemical compounds and/or byproducts is disclosed in connection with a hydrogen generating system 10 for generating hydrogen for powering a fuel cell. In an illustrative embodiment shown in FIG. 1, hydrogen generating system 10 may include a storage system 20 for storing a hydrogen liquid carrier. Storage system 20 may include a fuel tank 100 having several chambers (e.g., chambers 101 and 102), a carrier outlet line 113, (arrow 114 indicates a flow of a hydrogen liquid carrier), a spent carrier inlet line 115 (arrow 116 indicates a flow of a spent carrier), a reaction chamber 120 for producing hydrogen, and a catalyst 121 for facilitating generation of hydrogen from a hydrogen liquid carrier. In an illustrative embodiment shown in FIG. 1, a hydrogen outflow line 125A (arrow 122 indicates the direction of hydrogen flow) may deliver hydrogen from reaction chamber 120 to a hydrogen storage chamber 126. Chamber 126 may then deliver hydrogen via a hydrogen line 125B to a fuel cell 130.

In various embodiments, a hydrogen liquid carrier may include metal borohydrides. In an illustrative embodiment, metal borohydrides may include any chemical compound that may be described by formula $M^1\text{-}BH_4$, where $M^1$ may be a metal selected from the column I of the periodic table of elements, or alloys of metals selected from the column I of the periodic table of elements. In an illustrative embodiment, metal $M^1$ may include Li, Na, K, Rb, Cs, Ca, and Fr. In some embodiments, however, metal $M^1$ may be selected from column II of the periodic table and may include Mg and Be. Alternatively, $M^1$ metal may also include Al, Ti, Be, Zn, Sc, Ca or other suitable metals.

In some embodiments, a hydrogen liquid carrier may include chemical compounds containing more than one metal. In an illustrative embodiment, the hydrogen liquid carrier may include ternary hydrides with a chemical compound described by a formula $M^{1a}M^{1b}\text{-}H_4$, where $M^{1a}$ and $M^{1b}$ may be metals. In an example embodiment, $M^{1a}$ may include Li, Na, K, Rb, Cs, Ti, Be, Zn, Fr, or other suitable metals. In an example embodiment, $M^{1b}$ may include B, Al, Ni, Zn, Be, Ca, Sc, Ti, or other suitable metals. Additionally or alternatively, hydrogen liquid carrier may include quaternary hydrides, such as Li—B—N—H or other suitable quaternary hydrides described by formula $M^{1a}M^{1b}M^{1c}\text{-}H_4$.

The hydrogen liquid carrier may include other chemical compounds other than an aqueous solution of metal borohydrides. For example, hydrogen liquid carrier may include solubility-enhancing chemicals or stabilizers, such as soluble metal hydroxides (e.g., potassium hydroxide). Other usable stabilizers may include potassium hydroxide or lithium hydroxide, among others. The liquid component of a hydrogen liquid carrier may include any suitable liquid. Such liquids may include water or alcohols. The hydrogen liquid carrier may also include additives, stabilizers, or other reaction enhancers, such as potassium hydroxide as a stabilizer, and surfactant, or thickener of gelation agent.

In various embodiments, spent carrier may be formed during a reaction when hydrogen liquid carrier releases at least a portion of hydrogen contained within the hydrogen liquid carrier. In an example embodiment, a reaction may include the reaction of metal borohydrides (described by formula $M^1\text{-}BH_4$) with water producing hydrogen and a metal borate.

In an illustrative embodiment, an aqueous solution of $M^1$-$BH_4$ may be used as a hydrogen liquid carrier, and via chemical reaction, will release hydrogen and form a spent carrier, that will be an aqueous solution of metal borate hydrogen liquid carrier.

Figure 2:
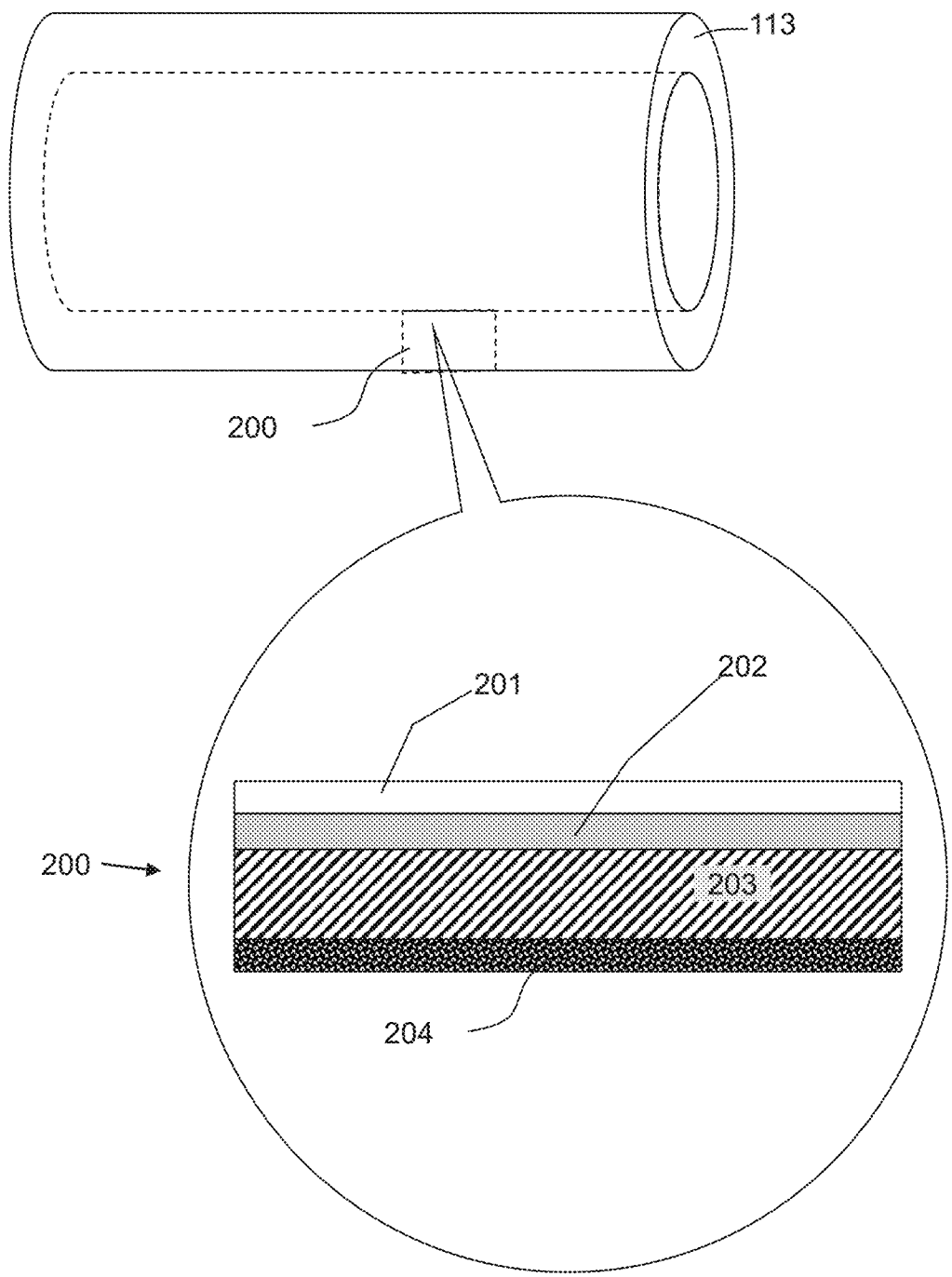
FIG. 2 is an illustrative cross-sectional view of a fuel line wall.

Carrier outlet line 113 may have various configurations. FIG. 2 shows one example configuration for a region 200 of carrier outlet line 113. For example, in some embodiments, carrier outlet line 113 may include an outer protective layer 201, an insulation layer 202, a structural layer 203 and a chemically inert layer 204. In various embodiments, described layers are only illustrative, and various other suitable layers may be present, or some of the layers described above may be omitted. For example, more than one suitable structural layer may be present. In some embodiments, a portion of outlet line 113 may contain a first set of layers forming a first portion of line 113 and another portion may contain a second set of layers forming a second portion of line 113 with the first line portion and the second line portion connected at a junction.

In some embodiments, outer protective layer 201 may include any layer that may protect outlet line 113 from interaction with an ambient environment. In an example embodiment, the outer protective layer may include a plastic layer (e.g., polyvinyl chloride or polytetrafluoroethylene layer) or rust preventing layer which may be formed as a metallic zinc layer, an oxide layer (e.g., aluminum oxide) and/or the like. In various embodiments, an insulation layer 202 may include a porous layer containing gas to reduce or minimize the effects of environmental temperature fluctuations on properties of a hydrogen liquid carrier. In an example embodiment, a material used in the insulation layer may include foam formed from various suitable materials such as expanded polystyrene foam.

In various embodiments, structured layer 203 may be formed from a material that can reduce or prevent the risk of a rupture or a leak of the outlet line 113 due to pressure within line 113. In an example embodiment, structured layer 203 may include copper, aluminum, stainless steel and/or the like. In some embodiments, structured layer 203 may contain an internal mechanical structure (e.g., the structured layer may be formed of a composite material with strength enforcing fibers or a strength enforcing filler material).

In various embodiments, chemically inert layer 204 may be deposited adjacent to a hydrogen liquid carrier to reduce or prevent a risk of various layers of outlet line 113 reacting with the hydrogen liquid carrier. In various illustrative embodiments, inner layer 204 may be formed from thermoplastic polyolefins such as polyethylene (PE), polypropylene (PP), or polybutene-1 (PB-1). In some embodiments, inner layer 204 may be formed from polyolefin elastomers (POE), polyisobutylene (PIB), ethylene propylene rubber (EPR), ethylene propylene diene monomer (M-class) or rubber (EPDM rubber). In some embodiments, inner layer 204 may be formed from fluoropolymers including, but not limited to, fluorinated ethylene propylene (FEP), polytetrafluoroethylene (PTFE), perfluoroalkoxy (PFA), a copolymer of ethylene and tetrafluoroethylene (ETFE) and/or the like.

In various embodiments, and similar to the structure shown in FIG. 2 for outlet line 113, spent carrier inlet line 115 (shown in FIG. 1) may also be constructed of several layers. Such layers may include an outer protective layer 201, insulation layer 202, structural layer 203 and chemically inert layer 204, as shown in FIG. 2. Additionally, or alternatively, chambers 101 and/or 102 of system 20 may be formed from several layers that may include outer protective layer 201, insulation layer 202, structural layer 203 and chemically inert layer 204 as described above. In various embodiments, the composition of inert layer 204 for inlet line 115 may be different from the composition of inert layer 204 for outlet line 113, in order to account for different chemical compounds of a spent carrier as compared to chemical compound forming a hydrogen liquid carrier.

In various embodiments, described layers forming walls of spent carrier inlet line 115 are only illustrative, and various other suitable layers may be present, or some of the layers described above may be omitted. In some embodiments, a portion of inlet line 115 may contain a first set of layers forming a first portion of line 115 and another portion of inlet line 115 may contain a second set of layers forming a second portion of line 115 with the first portion and the second portion connected at a junction. In various embodiments, line 115 may contain one or more portions.

In various embodiments, spent carrier inlet line 115 may deliver a spent carrier from reaction chamber 120 to one of chambers 101 or 102. In an illustrative embodiment, line 115 may further include cooling functionality. For example, line 115 may include at least a portion that can be cooled by releasing heat to a cooling system (not shown). In an example embodiment, a cooling system may include a system for circulating water in proximity to surfaces of line 115 to facilitate heat transfer from a spent carrier flowing through line 115 to the circulating water. In an example embodiment, heat may be subsequently transferred to the ambient environment (e.g., via a water-to-air convection process).

In various embodiments, a hydrogen liquid carrier may release hydrogen in a reaction chamber 120 when in contact with catalyst 121. Catalyst 121 may include any suitable catalyst for facilitating hydrogen production and may include transition metals, such as Fe, Co, Cu, Ni, Ru, Pd, Pt, their alloys, and combinations thereof. In various embodiments, generated hydrogen may be delivered via outflow line 125A to hydrogen storage chamber 126 and subsequently to fuel cell 130. In various embodiments, system 10 may include pressure sensors and pressure pumps (not shown in FIG. 1) to monitor and control the flows of a hydrogen liquid carrier, a spent carrier, and/or flow through lines 113, 115, 125A and 125B. For example, a pump may be used to pump the hydrogen liquid carrier into a pressurized reaction chamber 120. In some embodiments, the hydrogen liquid carrier may flow into reaction chamber 120 as hydrogen is released from reaction chamber 120 and stored in hydrogen chamber 126. In an example embodiment, a pump may be used to facilitate a transfer of hydrogen from chamber 120 to chamber 126.

In various embodiments, storage system 20 may include one or more fuel tanks 100, as shown in FIG. 1, for storing a hydrogen liquid carrier and a spent hydrogen liquid carrier. In various embodiments, a fuel tank may include a substantially rigid exterior tank. Herein, the term "substantially rigid fuel tank" refers to an enclosure configured for storing liquids that may remain undeformed in the presence of liquids stored therein or when no liquid is stored in the tank. For example, fuel tank 100 of system 20 may remain undeformed in the presence of pressure forces applied to walls of fuel tank 100 under at least normal operating parameters of system 10.

In various embodiments, fuel tank 100 may include one or more chambers. In an example embodiment, fuel tank 100 may include first chamber 101 and second chamber 102. In various embodiments, chambers of fuel tank 100 may include enclosures configured to contain liquid and/or gas with one or more specified outlet or inlet lines for transferring a liquid and/or a gas in and/or out of chambers 101 and 102. In various embodiments, transferring a liquid and/or a gas in and/or out of a chamber (e.g., chamber 101 or 102) may be accomplished solely through specified outlet or inlet lines, which may help to isolate contained liquid and/or gas and to avoid undesired interactions between contained liquid and/or gas and environments outside of chambers 101/102. In various embodiments, chamber 101 may be fluidly isolated from chamber 102, such that fluid from chamber 101 may not be directly transferred to chamber 102.

In various embodiments, one or more chambers of fuel tank 100 may include a dynamically expandable and contractible enclosure. In an example embodiment, chamber 101 and 102 may include a dynamic boundary between the two chambers. In an example embodiment, the dynamic boundary may include movable walls. For example, the movable walls may move to expand the volume of chamber 101 and, in turn, contract the volume of chamber 102. Alternatively, the movable walls may move to expand the volume of chamber 102 and contract the volume of chamber 101. In an illustrative embodiment, the dynamic boundary may include foldable walls. For example, the foldable walls may fold/unfold to expand the volume of one chamber (e.g., chamber 101) and contract the volume of another chamber (e.g., chamber 102). Additionally, or alternatively, in an illustrative embodiment, the dynamic boundary may include stretchable walls. For example, the stretchable walls may stretch/un-stretch to expand the volume of one chamber (e.g., chamber 101) and contract the volume of another chamber (e.g., chamber 102).

In various embodiments, a part of the dynamic boundary may include movable walls or/and a part of the dynamic boundary may include foldable walls or/and a part of the dynamic boundary may include stretchable walls. In various embodiments, a part of the dynamic boundary may include solid (i.e., substantially unfoldable or unstretchable) walls, wherein the term "substantially unfoldable" or "substantially unstretchable" indicates that solid walls are not foldable or stretchable under nominal (i.e., allowed) operational conditions for fuel tank 100.

In various embodiments, foldable walls of the dynamic boundary may be formed from the materials including thermoplastic polyolefins such as polyethylene (PE), polypropylene (PP), or polybutene-1 (PB-1), or any other suitable materials. In some embodiments, the foldable walls may be formed from polyolefin elastomers (POE), polyisobutylene (PIB), ethylene propylene rubber (EPR), ethylene propylene diene monomer (M-class) or rubber (EPDM rubber). In some embodiments, the foldable walls may be formed from fluoropolymers including, but not limited to, fluorinated ethylene propylene (FEP), polytetrafluoroethylene (PTFE), perfluoroalkoxy (PFA), a copolymer of ethylene and tetrafluoroethylene (ETFE) and/or the like.

Figure 3A:
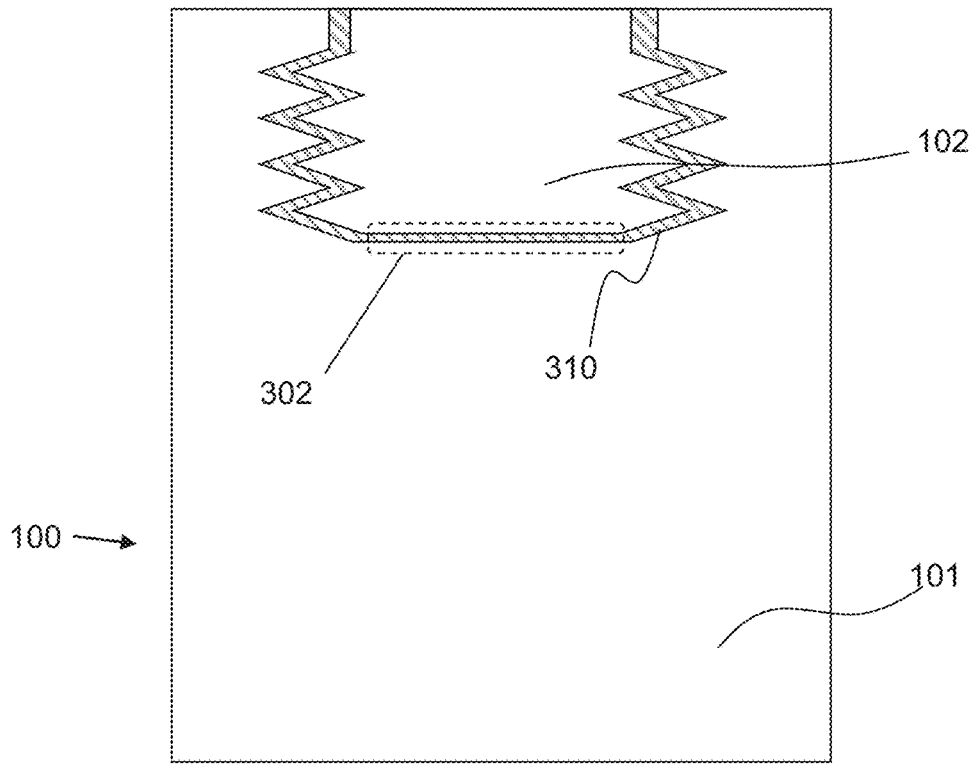
FIGS. 3A and 3B are illustrative cross-sectional views of a fuel tank consistent with disclosed embodiments.
Figure 3B:
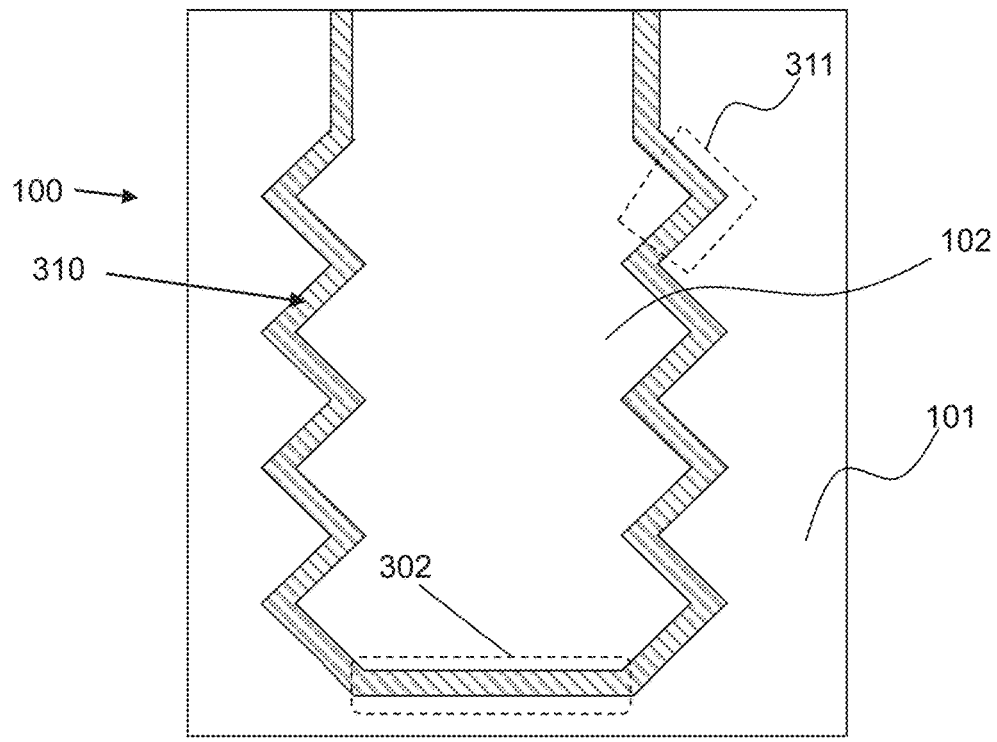
Figure 3C:
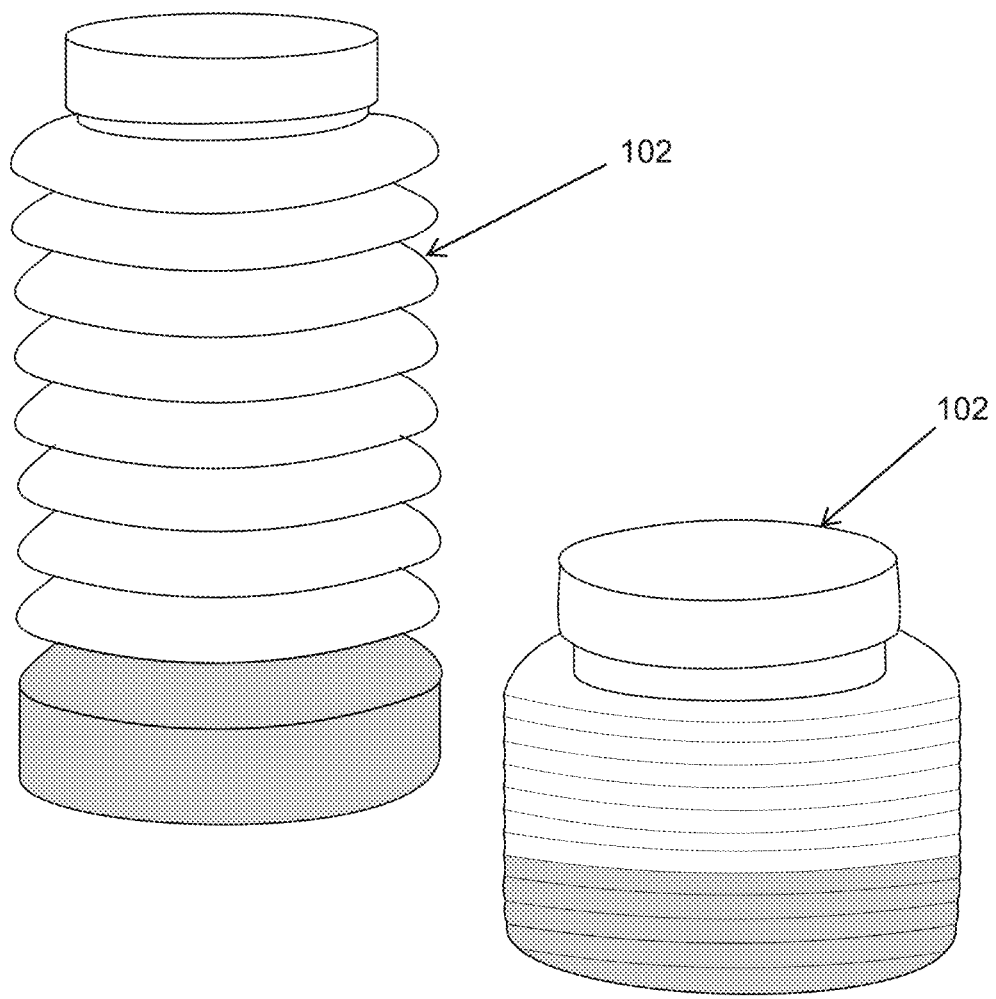
FIG. 3C is an illustrative three-dimensional view of fuel tank components consistent with disclosed embodiments.

FIGS. 3A and 3B show illustrative embodiments of a cross-sectional view of fuel tank 100 including chambers 101 and 102. In illustrative embodiments, depicted in FIGS. 3A and 3B, chamber 102 may include an expandable bladder in the form of a bellows that may include a dynamic boundary 310 with foldable walls 311, and movable walls 302. In various embodiments, foldable walls 311 may also be movable walls as various portions of walls 311 may move relative to various wall segments that form dynamic boundary 310. In an illustrative embodiment, chamber 101 and 102 may change volume. In an example embodiment, when the volume of chamber 102 is expanding, the volume of chamber 101 may be reduced. As shown in FIG. 3A, when chamber 102 is in a contracted state, chamber 101 may be in an expanded state, and, as shown in FIG. 3B, when chamber 102 is in an expanded state, chamber 101 may be in a contracted state. FIG. 3C shows a three-dimensional view of various examples of configurations for chamber 102 of FIG. 3B.

In various embodiments, chamber 102 may be positioned to be partially or fully within chamber 101. As used herein, unless otherwise noted, the term "partially inside" or "fully inside" may refer to the amount of the internal volume of chamber 102 positioned inside the internal volume of chamber 101. For example, if part of the internal volume of chamber 102 is positioned inside the internal volume of chamber 101, chamber 102 is referred to as partially inside chamber 101. Alternatively, if the entirety of the internal volume of chamber 102 is positioned inside the internal volume of chamber 101, chamber 102 is referred to as fully inside chamber 101.

Figure 4A:
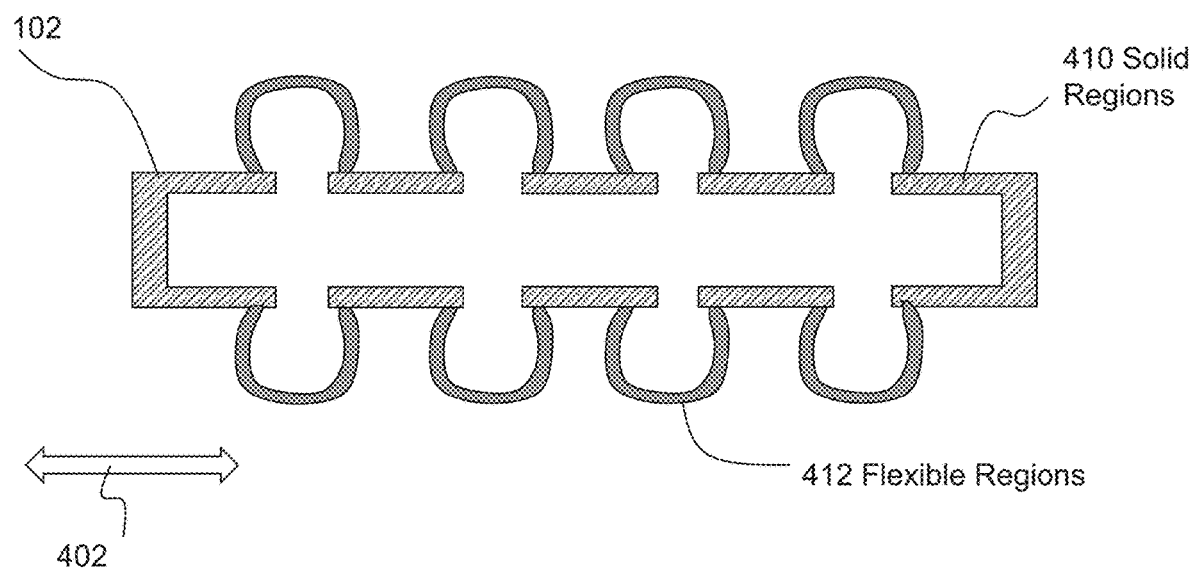
FIGS. 4A and 4B are illustrative cross-sectional views of an expandable and contractible chamber consistent with disclosed embodiments.
Figure 4B:
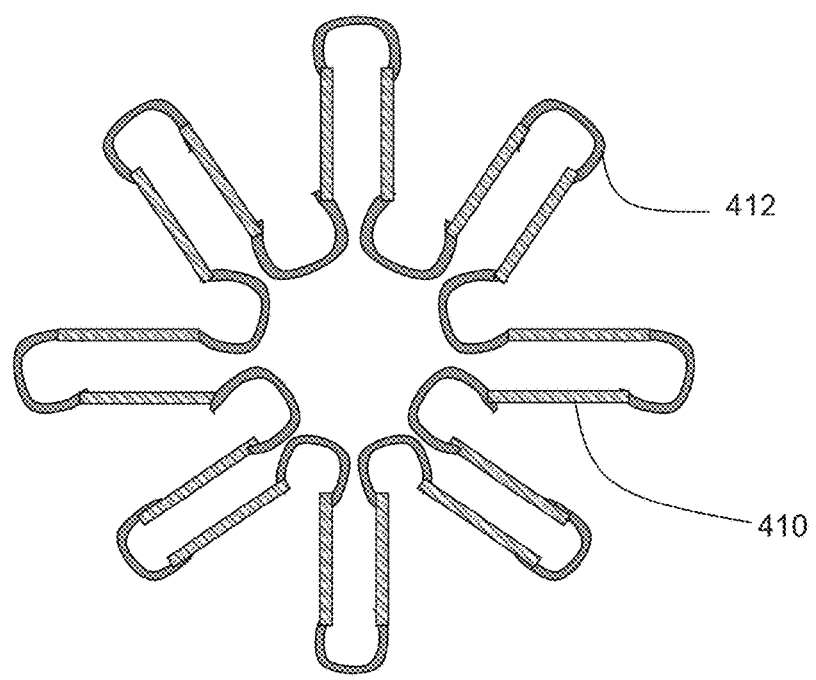

Various embodiments describing chamber 102 as an expandable or contractible bellows are only illustrative, and various other embodiments of chamber 102 with dynamic boundaries may be selected. For example, FIGS. 4A and 4B show a cross-sectional view of possible configurations of expandable and contractible chamber 102 consistent with embodiments of the present disclosure. In an illustrative embodiment, shown in FIG. 4A, chamber 102 may have solid regions 410 and flexible regions 412. Flexible regions 412 may allow chamber 102 to expand and contract in a direction, for example, shown by arrow 402.

Figure 5A:
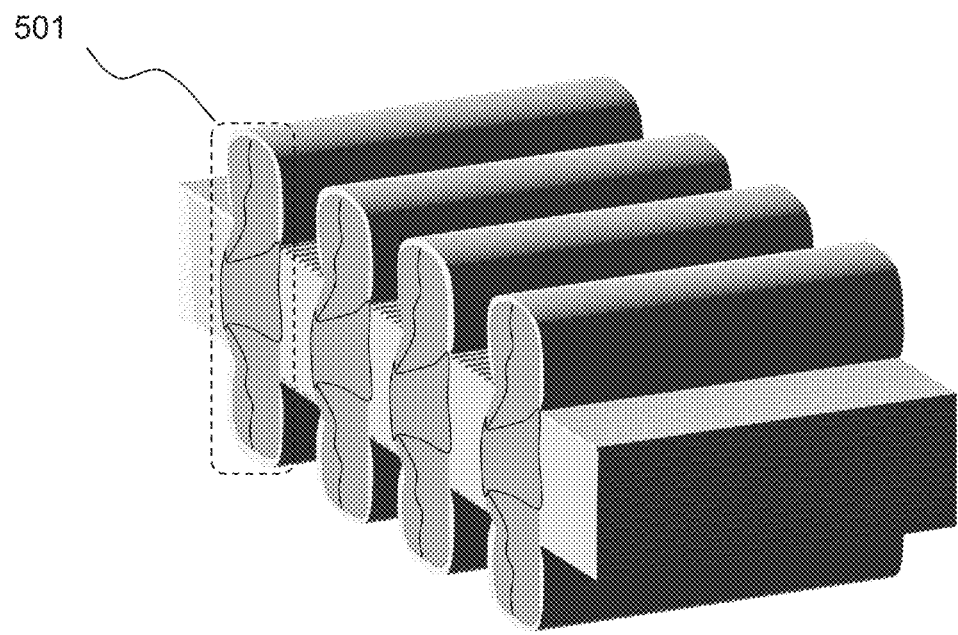
FIGS. 5A and 5B are illustrative three-dimensional views of an expandable and contractible chamber consistent with disclosed embodiments.
Figure 5B:
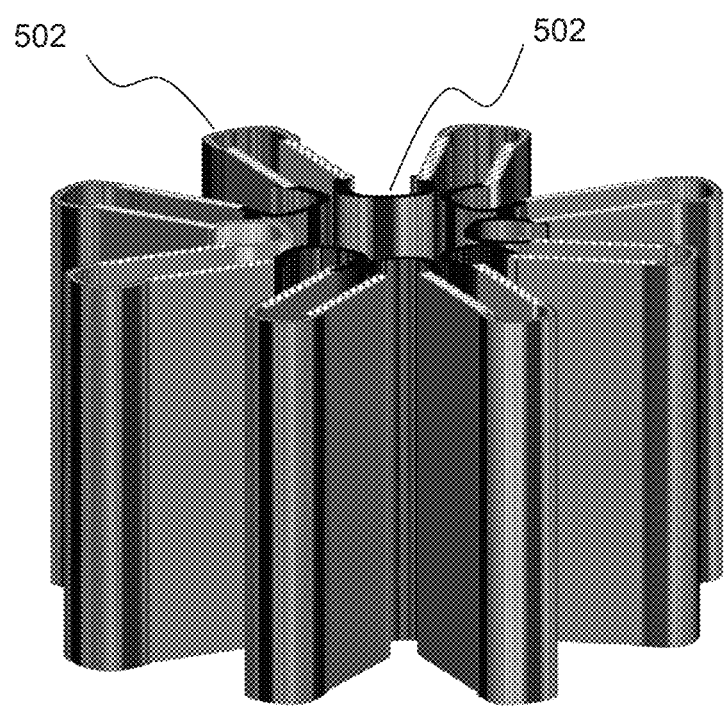
Figure 5C:
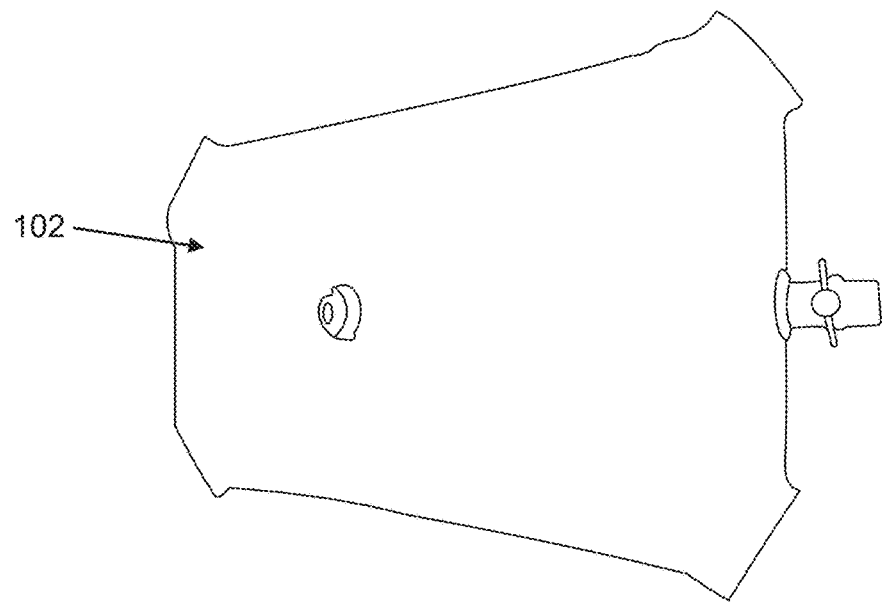
FIG. 5C is an illustrative three-dimensional view of an expandable and contractible chamber in the form of a bladder consistent with disclosed embodiments.
Figure 5C:
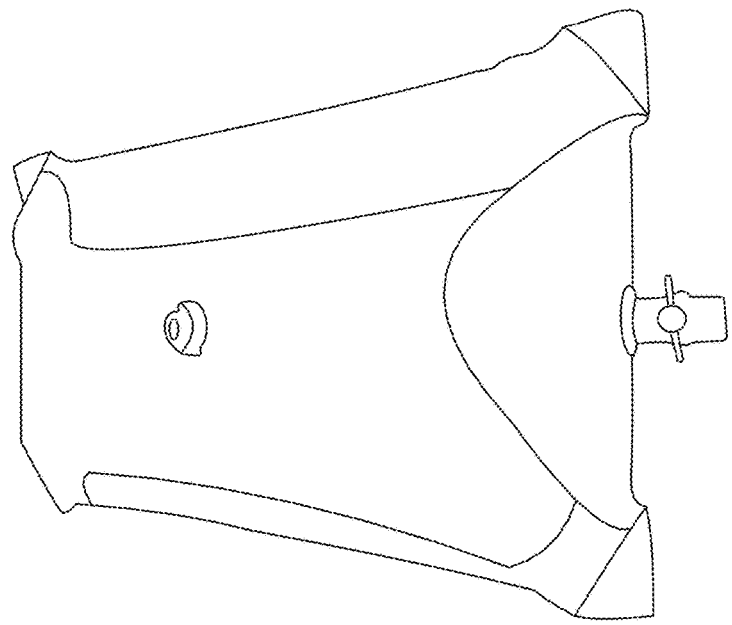

Similar to the embodiment shown in FIG. 4A, FIG. 4B shows a cross-sectional view of a radially expandable and contractible chamber 102. In an illustrative embodiment, chamber 102 may have solid walls 410 and flexible regions 412. Illustrative three-dimensional views of chamber 102 of FIG. 4A and FIG. 4B are shown respectively in FIG. 5A and FIG. 5B. It should be noted that in order for chambers to expand, end segments (e.g., 501 regions shown in FIG. 5A) may include stretchable and/or foldable material. Similar regions 502 in the embodiment of FIG. 5B may also include stretchable and/or foldable material to enable expansion and contraction (e.g., in the radial direction in the illustrated embodiment of FIG. 5B). Various embodiments described above are only illustrative and other expandable and contractible chambers 102 may be employed. For example, FIG. 5C shows expandable and contractible chamber 102 in the form of a collapsible bladder.

Figure 6A:
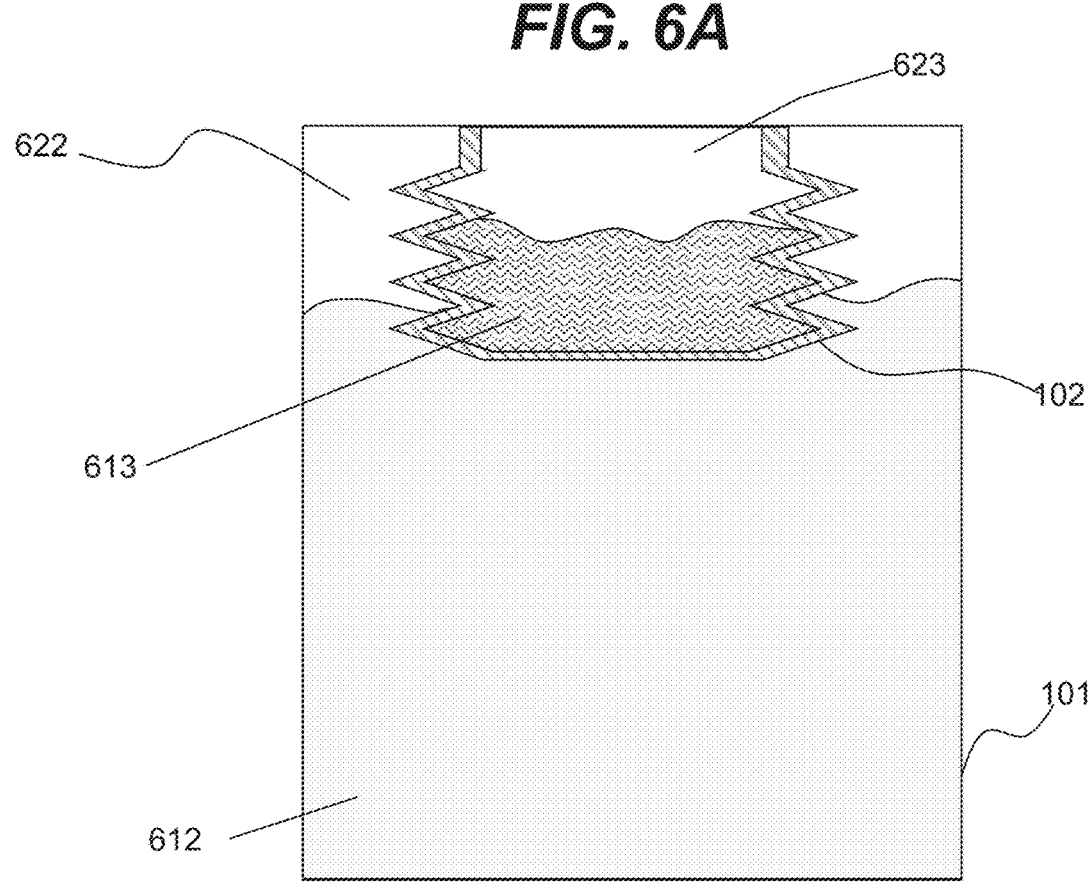
FIGS. 6A and 6B are illustrative cross-sectional views of a fuel tank containing gas consistent with disclosed embodiments.
Figure 6B:
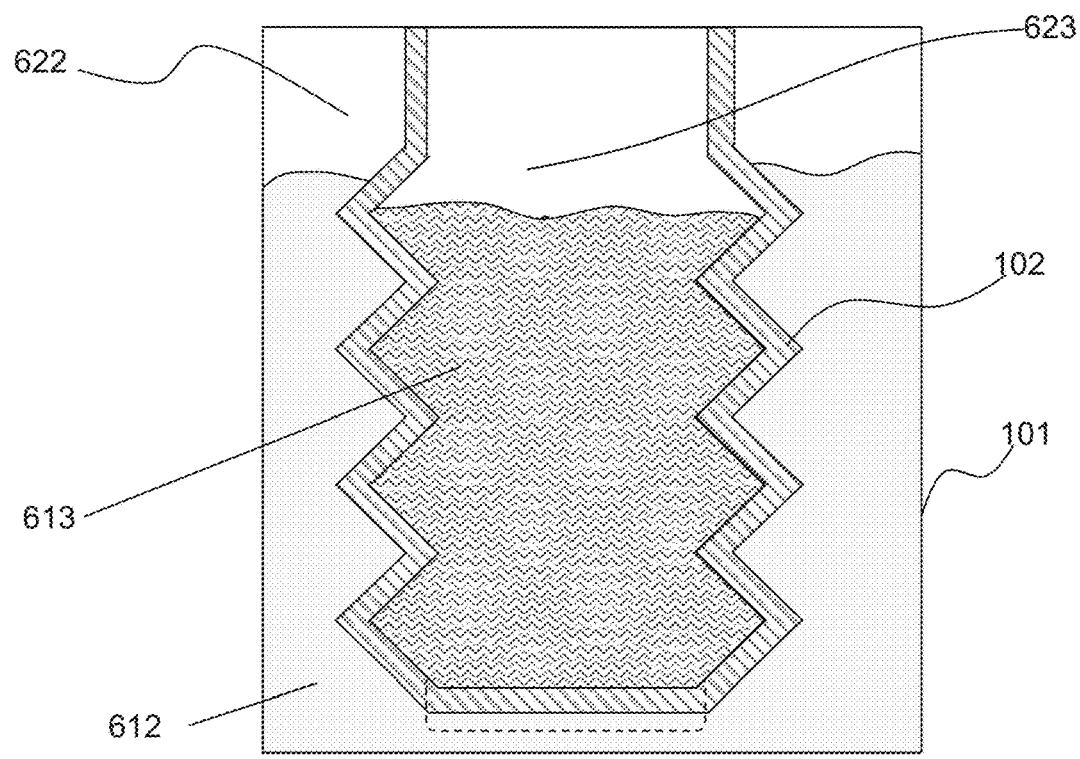

In various embodiments, chambers 101 and 102 may be configured for containing a liquid and/or a gas. In an illustrative embodiment shown in FIG. 6A, chamber 101 may include a region 612 occupied by a liquid and a region 622 occupied by a gas. Similarly, chamber 102 may contain a region 613 occupied by a liquid and a region 623 occupied by a gas. In various embodiments, liquid occupying region 612 may include a hydrogen liquid carrier, and liquid occupying region 613 may include a spent carrier. Alternatively, liquid occupying region 612 may include the spent carrier, and liquid occupying region 613 may include the hydrogen liquid carrier. In various embodiments, chambers 101 and 102 may be associated with liquid and gas lines for transferring liquid and/or gas in and out of the chambers. In an example embodiment, gas may be transferred into chamber 101 and/or chamber 102 to maintain desired target pressure levels in chambers 101 and 102. In various embodiments, maintaining target pressure may promote desired flow characteristics for the flow of the hydrogen liquid carrier into reaction chamber 120, and for the flow of the spent carrier into a fuel tank 100. In various embodiments, gas present in chambers 101 and 102 may include nitrogen, air, and/or water vapor (or any other suitable gases).

In various embodiments, a flow of hydrogen liquid carrier may proceed through outlet line 113 into reaction chamber 120 (as shown in FIG. 1). As the hydrogen liquid carrier flows out from one of the chambers of fuel tank 100, such as chamber 101, the pressure in chamber 101 may decrease. As a result, a dynamic boundary forming chamber 102, may move, expanding chamber 102 and, in turn, reducing a volume associated with chamber 101. In various embodiments, as chamber 102 is expanding, a gas may be flowed into or out of chamber 102 to maintain a target pressure in chamber 102. Similarly, when a hydrogen liquid carrier is flowing from chamber 101, the pressure in chamber 101 may be controlled by flowing a gas into or out of chamber 101. In various embodiments, the gas pressure in both chambers may be maintained at desired levels (e.g., at ambient gas levels) by allowing chambers 101 and 102 to be vented during the flow of the hydrogen liquid carrier and the spent carrier.

In various embodiments, a flow of spent carrier may proceed through inlet line 115 into chamber 102 of fuel tank 100, as shown in FIG. 1. As the spent carrier flows into chamber 102, the pressure in chamber 102 may be controlled by venting chamber 102. In various embodiments, as the spent carrier flows into chamber 102, chamber 102 may expand, and chamber 101 may contract. In an illustrative embodiment, chamber 101 may be vented to allow chamber 102 to expand. In some embodiments, the pressure in chamber 101 may be controlled by releasing at least some of the gas contained in chamber 101 to allow chamber 102 to expand. In some embodiments, a gas may be flowed into chamber 102 to maintain a target pressure in chamber 102. In various embodiments, the gas pressure in both chambers may be maintained at desired levels (e.g., at ambient gas levels) by allowing chamber 101 and 102 to be vented during the flow of the spent carrier.

In various embodiments, temperature and pressure sensors may be included in chamber 101 and/or 102 to monitor the temperature and pressure conditions during operation of the chambers. In an example embodiment, a hydrogen sensor may be present in a chamber containing the hydrogen liquid carrier in order to evaluate the formation of hydrogen in the chamber (e.g., to monitor the formation rate of hydrogen, the partial pressure of hydrogen, etc.). In various embodiments, one or more controllers may be used to maintain desired pressure conditions in fuel tank 100 (e.g., in chambers 101 and 102). In various embodiments, pressure levels within chambers 101 and 102 may vary depending on the pressure in reaction chamber 120. Alternatively, pressure levels in chambers 101 and 102 may be maintained at target levels, and a compressor may be used to deliver the hydrogen liquid carrier into reaction chamber 120 by pressurizing the hydrogen liquid carrier.

In various embodiments, fuel tank 100 may contain an outlet 113 that may be connected to chamber 101 and inlet 115 that may be connected to chamber 102, as shown in FIG. 1. The inlet and outlet may be flow connected such that a flow through the outlet is returned to the inlet (whether directly or indirectly through one or more other conduits, chambers, reservoirs, etc.). During the flow, the dynamic boundary of chamber 102 is configured to change position causing a change in a volume of chamber 102 and chamber 101.

Figure 7:
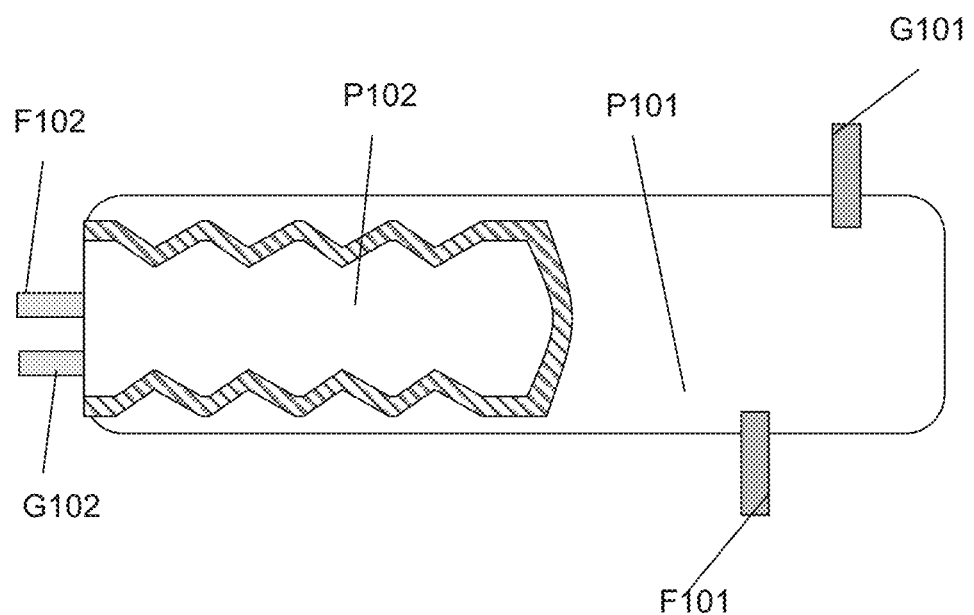
FIG. 7 is an illustrative cross-sectional view of a fuel tank with pressure sensors and flow controllers consistent with disclosed embodiments.

FIG. 7 shows an illustrative embodiment of fuel tank 100 with a pressure sensor P101 for chamber 101, a pressure sensor P102 for chamber 102, and pressure controllers F101, G101, F102, and G102 associated with various carrier and gas outlets/inlets. In an illustrative embodiment, controller F101 may control the flow of a hydrogen liquid carrier by controlling the pressure difference between a pressure in reaction chamber 120 and a pressure in chambers 101 and/or 102. Such pressure differential may be controlled by monitoring pressure in the chambers using pressure sensors P101 and P102 and causing gas to be flowed into or vented from either chamber 101 or 102 if a pressure differential different from a target pressure differential is observed.

In various embodiments, a gas reservoir may be present to supply a gas into chambers 101 and/or 102. Additionally, or alternatively, when the air is used as a gas for chambers 101 and/or 102, air may be obtained from the ambient environment. In various embodiments, controller G101 may control the flow of a gas (e.g., nitrogen, water vapor, or air, etc.) into chamber 101 to control a pressure in chamber 101 of fuel tank 100. Similarly, controller G102 may control the flow of gas into chamber 102 to control the pressure in chamber 102.

Figure 8A:
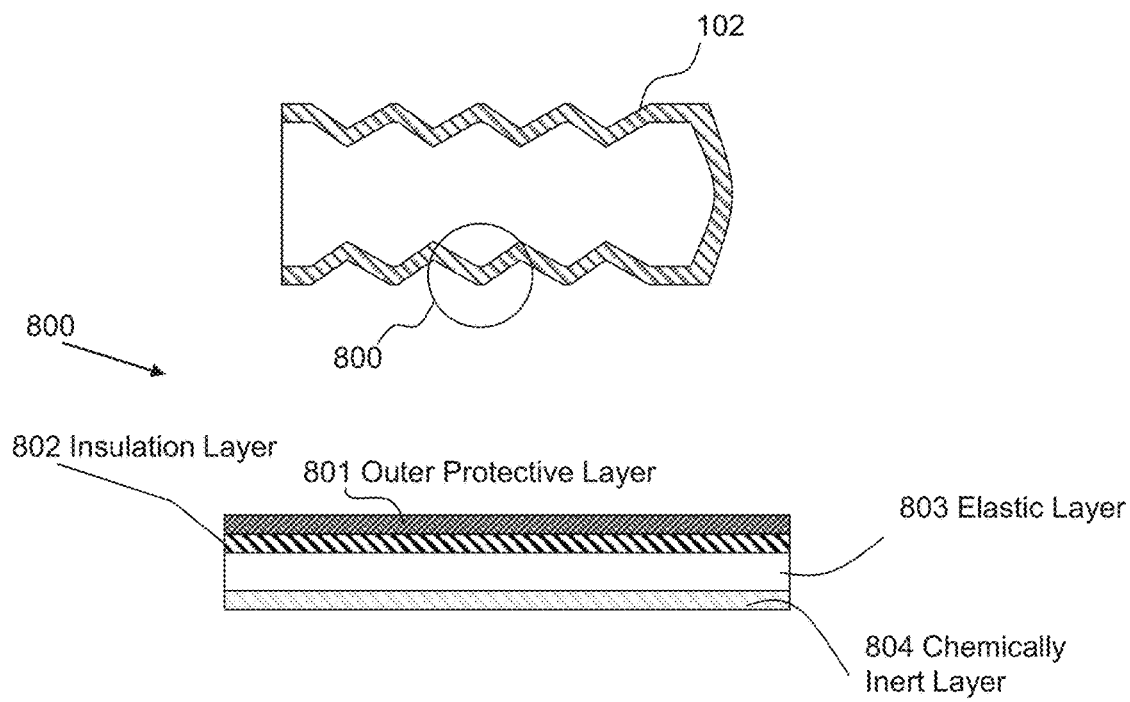
FIG. 8A is an illustrative cross-sectional view of a chamber wall consistent with disclosed embodiments.

In various embodiments, expandable and collapsible chamber 102 may include foldable and elastic walls having multiple layers. For example, FIG. 8A shows a cross-sectional view of region 800 of an expandable/collapsible chamber containing multiple layers. In some embodiments, the walls of chamber 102 may include an outer protective layer 801, an insulation layer 802, an elastic layer 803, and/or a chemically inert layer 804. The described layers forming walls of expandable and collapsible chamber 102 are only illustrative, and various other suitable layers may be present, or some of the layers described may be omitted. In some embodiments, only some portions of chamber 102 may be formed of the layers described, while other portions may be formed from a solid material (e.g., not containing multiple layers), or from a material containing more or fewer layers than described. In an illustrative embodiment, chemically inert layer 804 may be deposited over the inside surfaces of chamber 102 to reduce a likelihood of walls of chamber 102 reacting with a stored liquid, such as a hydrogen liquid carrier. In some embodiments, the flexible regions (e.g., flexible regions 412 illustrated in FIGS. 4A and 4B, as well as in FIG. 8B) may be formed of multiple layers formed from foldable and elastic material, while solid regions (e.g., regions 410 illustrated in FIGS. 4A and 4B, as well as in FIG. 8B) may be formed from solid material with protective chemically inert layer 804.

In some embodiments, outer protective layer 801 may include any layer formed from a foldable and elastic material that may protect various layers of chamber 102 from interaction with the environment. In an example embodiment, outer protective layer 801 may include a plastic layer (e.g., polyvinyl chloride or polytetrafluoroethylene layer).

In various embodiments, an insulation layer 802 may include a layer formed from a porous foldable and/or elastic material such as rubber, porous rubber, porous plastics and/or the like. In various embodiments, structured layer 803 may be formed from a foldable and/or elastic material that can help to avoid a rupture or a leak in chamber 102. In an example embodiment, structured layer 803 may be formed from a rubber (e.g., EPDM rubber), polyolefin elastomers, and/or the like. In some cases, structured layer 803 may contain mechanical support structures (e.g., structured layer may be formed of a composite material with a strength enforcing filler material, fibers, etc.). In some cases, the filler material may include rubber fibers, and in some cases, glass or metallic fibers (or fibers of other materials) may be used to strengthen structured layer 803.

Figure 8B:
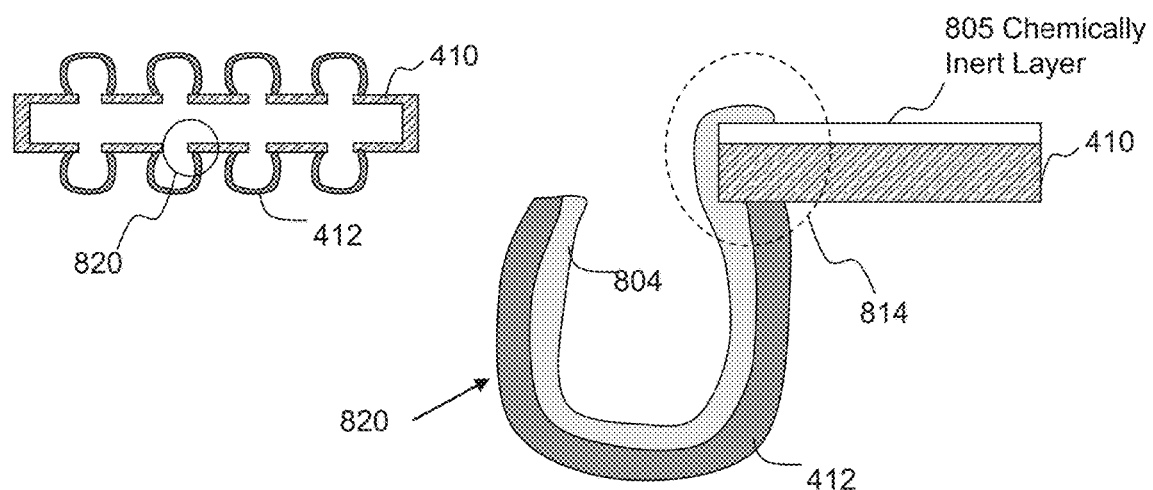
FIG. 8B is an illustrative cross-sectional view of a chamber wall containing solid and flexible regions consistent with disclosed embodiments.

In various embodiments, chemically inert layer 804 deposited over surfaces of flexible region 412 may be formed from a different material than a material used to form a chemically inert layer 805 deposited over solid region 410, as shown in FIG. 8B. In an illustrative embodiment shown by a region 820 in FIG. 8B, layer 804 may be flexible and/or elastic, while layer 805 may not require the flexibility and/or elasticity requirements of layer 804. In some cases, layer 804 may be formed from thermoplastic polyolefins such as polyethylene (PE), polypropylene (PP), or polybutene-1 (PB-1), rubber (e.g., styrene-butadiene rubber), polyolefin elastomers (POE), ethylene propylene rubber (EPR), polyisobutylene (PIB), ethylene propylene diene monomer (M-class) or rubber (EPDM rubber), while layer 805 may be formed from as well as various materials that may be used to form layer 804. In some embodiments, inner layer 805 may be formed from fluoropolymers including, but not limited to, fluorinated ethylene propylene (FEP), polytetrafluoroethylene (PTFE), perfluoroalkoxy (PFA), a copolymer of ethylene and tetrafluoroethylene (ETFE) and/or the like. In some embodiments, layer 804 may cover solid region 410 and a portion of layer 805, as shown by a region 814 in FIG. 8B to protect solid region 410 from a hydrogen liquid carrier in region 814.

Figure 9A:
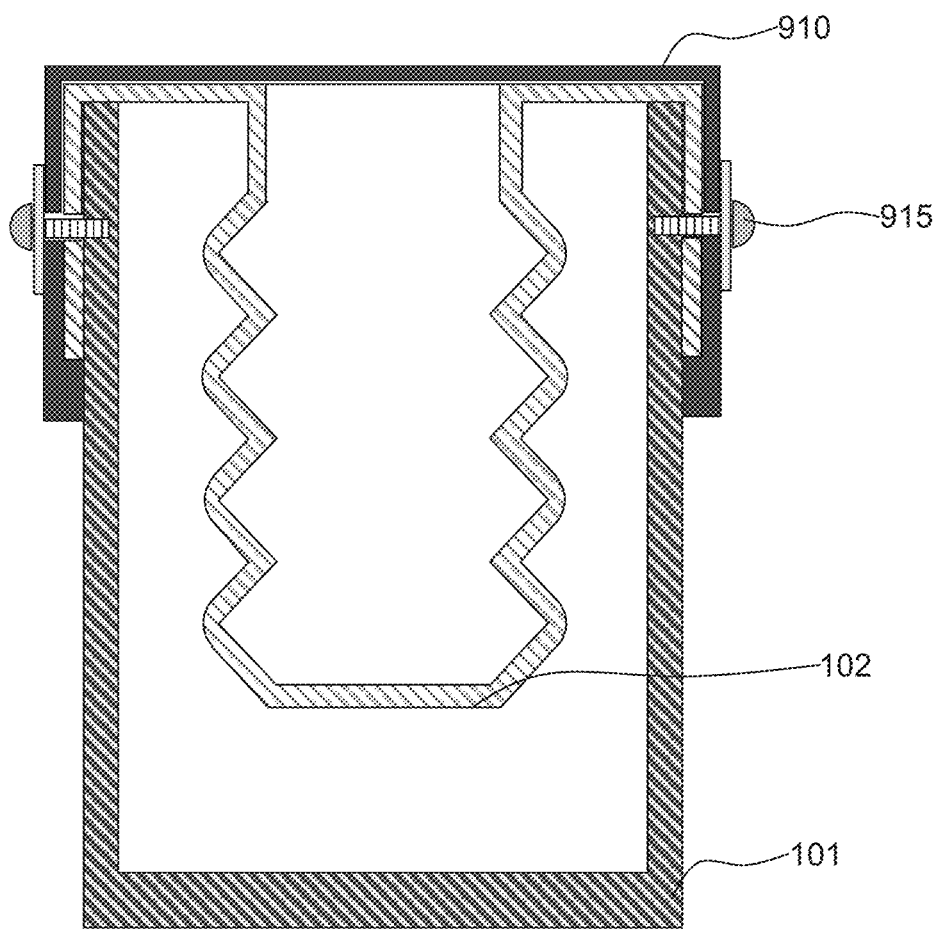
FIG. 9A is an illustrative cross-sectional view of a fuel tank with a replaceable chamber consistent with disclosed embodiments.
Figure 9B:
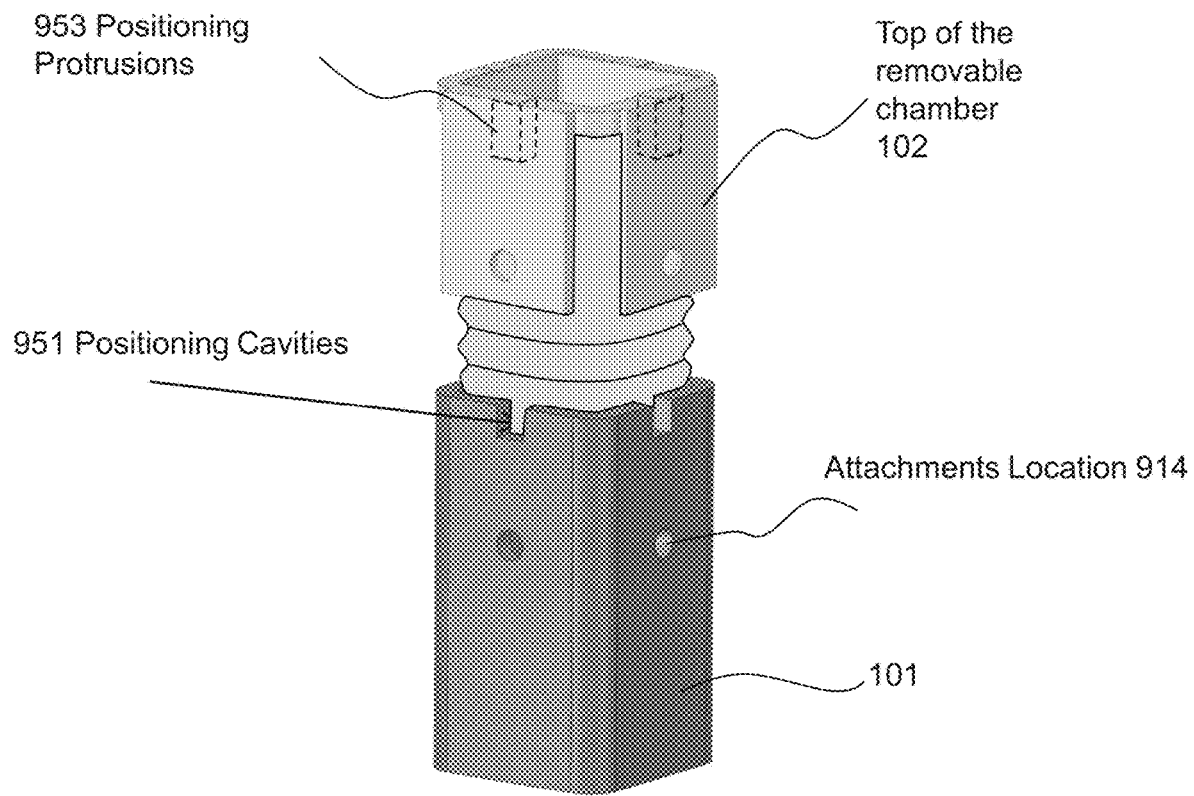
FIGS. 9B and 9C are illustrative three-dimensional views of a replaceable chamber consistent with disclosed embodiments.
Figure 9C:
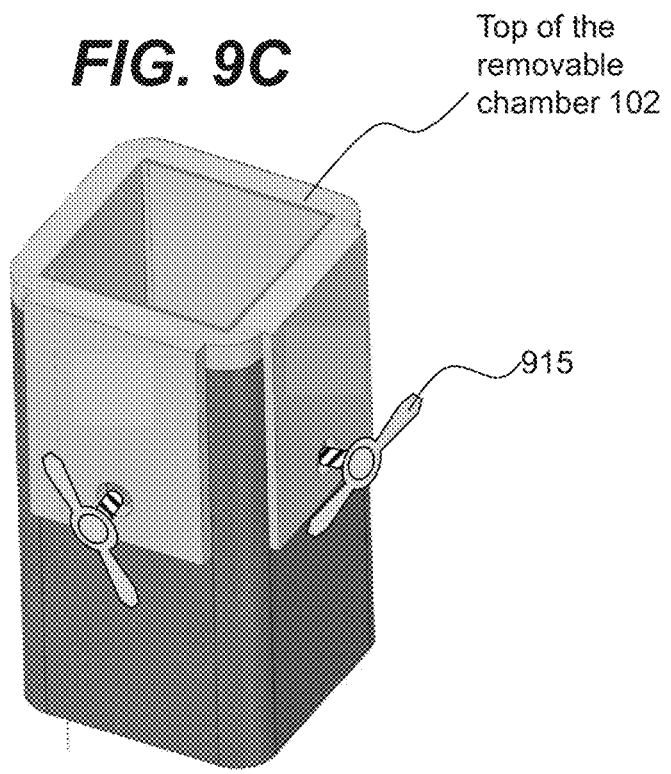

In various embodiments, chamber 102 may be configured to be detachable and replaceable. In an illustrative embodiment shown in FIG. 9A, chamber 102 may be inserted into chamber 101 and attached to chamber 101 using attachments 915 (e.g., bolts). In an illustrative embodiment, chamber 102 may be further secured by a chamber lid 910 that may be attached to chamber 101 via attachments 915. FIGS. 9B and 9C show a three-dimensional view of an example embodiment shown in FIG. 9A. In an illustrative embodiment, chamber 101 shown in FIG. 9B may contain positional cavities 951 that may be used for securing detachable and removable chamber 102. In some embodiments, chamber 102 may include positioning protrusions 953 that may be inserted into cavities 951 for positioning and securing chamber 102 at the attachment locations 914. FIG. 9C shows an example embodiment of removable chamber 102 that is fully inserted into chamber 101 and secured by attachments 915.

Figure 10:
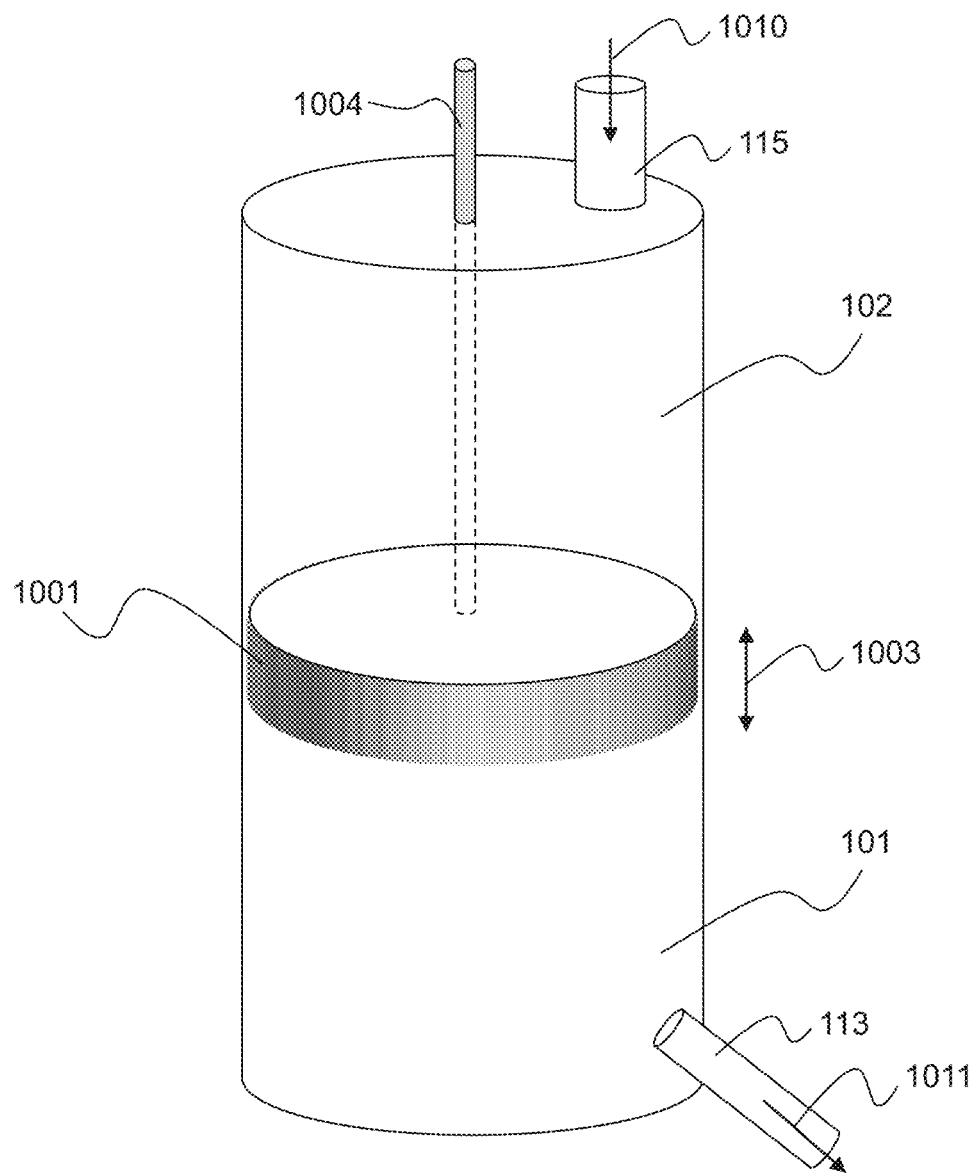
FIG. 10 is an illustrative three-dimensional view of a fuel tank with expandable and contractible chambers consistent with disclosed embodiments.

Various embodiments describing chamber 102 as an expandable and contractible bladder are only illustrative, and various other embodiments of an expandable and contractible chamber 102 may be selected. In an example embodiment shown in FIG. 10, a movable plunger 1004 with a plunger tip 1001 may be used as a dynamic boundary separating chamber 102 and chamber 101. The plunger tip 1001 may be moved up and down as indicated by an arrow 1003. In an illustrative embodiment, a flow of spent carrier may be introduced through inlet line 115 into chamber 102 as indicated by arrow 1010, and a hydrogen liquid carrier may be flowed from chamber 101 through outlet line 113 as indicated by arrow 1011. In an example embodiment, as the spent carrier is introduced in chamber 102, plunger tip 1001 may move to expand chamber 102 and contract chamber 101.

Figure 11A:
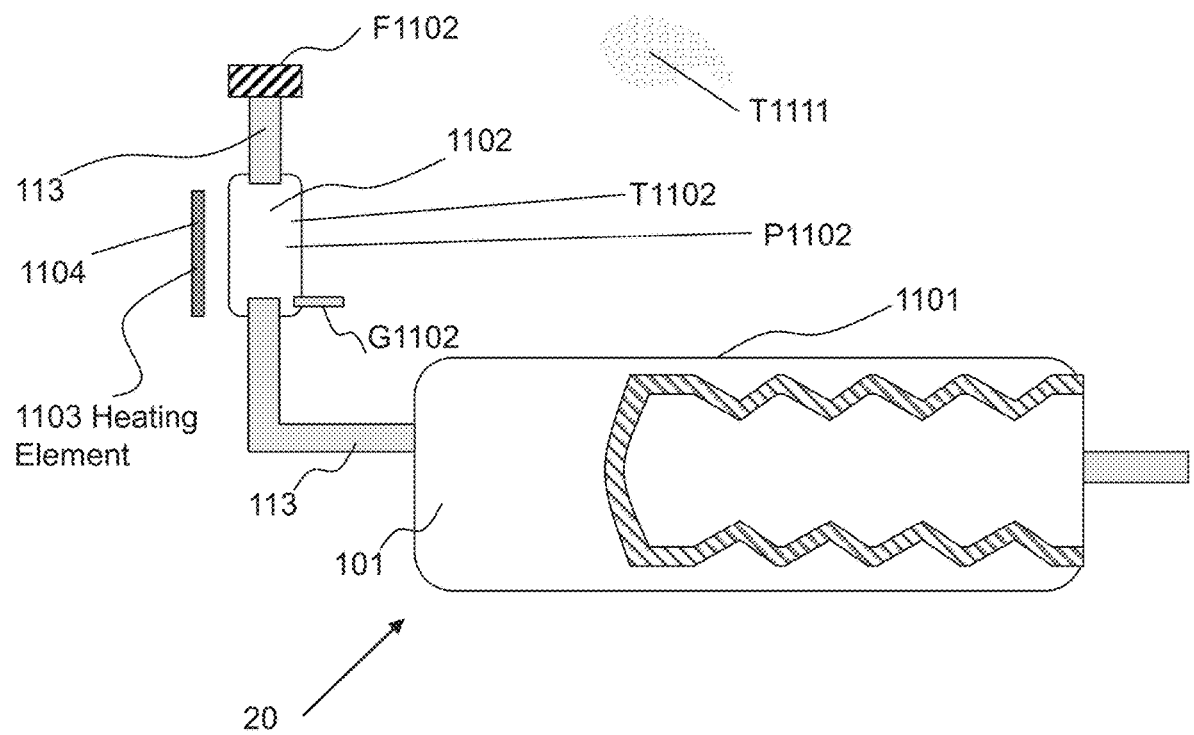
FIG. 11A is an illustrative cross-sectional view of the main fuel tank with an additional fuel tank consistent with disclosed embodiments.

In various embodiments, system 20 may include one or more fuel tanks. FIG. 11A shows an illustrative embodiment of system 20 including a main fuel tank 1101 and a cold start fuel tank 1102. In various embodiments, fuel tank 1101 may correspond to fuel tank 100 as described above. In various embodiments, tank 1102 may be fluidly connected to chamber 101 and may be configured to contain a hydrogen liquid carrier. In various embodiments, temperature and pressure of the hydrogen liquid carrier in tank 1102 may be maintained within a range of target values, in order to mitigate delays associated with a startup of a reaction for releasing hydrogen from the hydrogen liquid carrier in reaction chamber 120. In an example embodiment, tank 1102 may contain hydrogen liquid carrier maintained at target temperature and/or pressure by cooling or heating tank 1102. If cooling is required, tank 1102 may be cooled using any suitable cooling approach (e.g., liquid cooling, including water cooling), by flowing water or any other suitable liquid coolant in proximity (e.g., adjacent) of surfaces of tank 1102 through a set of channels for carrying the liquid. If heating of the hydrogen liquid carrier is desired (e.g., due to low ambient environmental temperatures), tank 1102 may be heated using a heating element 1103. Heating element 1103 may heat tank 1102 via conduction heating (e.g., resistive heating), induction heating, convective heating (e.g., flowing heated liquid in proximity of surfaces of tank 1102) or, in some cases, radiation heating (e.g., infrared heating).

In various embodiments, heating element 1103 may reuse heat from various components of system 20. For example, heating element 1103 may be part of a liquid cooling system that may be used to cool various components of system 20 and transfer heat to the liquid of the liquid cooling system. In an illustrative embodiment, the liquid cooling system may be used to cool reaction chamber 120, hydrogen storage tank 126 or fuel cell 130. In addition, when system 20 is a part of a vehicle, the liquid cooling system may be used to cool various vehicle components such as an engine of the vehicle, brakes of the vehicle, etc. In various embodiments, heat transferred to the liquid of the liquid cooling system may be used for heat element 1103 to heat the hydrogen liquid carrier in fuel tank 1102. In various embodiments, different sources of energy and heat may be used by heating element 1103 to heat the hydrogen liquid carrier in fuel tank 1102. For example, heating element 1103 may use electrical or chemical energy (e.g., energy from a battery, or energy from gas or gasoline, or energy from stored hydrogen in chamber 126) to heat a first amount of the hydrogen liquid carrier during startup of system 20. During operation of system 20, heat received from the liquid of the liquid cooling system may be used to maintain the adequate temperature of the hydrogen liquid carrier in fuel tank 1102. In various embodiments, the first amount of the hydrogen liquid carrier may be sufficiently small to be heated quickly (e.g., the first amount of the hydrogen liquid carrier may be heated in a few minutes).

In an illustrative embodiment, a hydrogen liquid carrier may contain additives that may lower the freezing temperature of the hydrogen liquid carrier. In an example embodiment, the additives may include glycerol, ethylene glycol, etc. Additionally, or alternatively, fuel tank 1102 may maintain a separate hermetically isolated and/or thermally insulated chamber for storing the first amount of hydrogen liquid carrier that may be used for a startup of system 20. In an example embodiment, the insulated chamber may include a double-walled chamber enclosing a vacuum.

In various embodiments, in order to maintain the target temperature and pressure values for hydrogen liquid carrier stored in tank 1102, temperature and pressure sensors may be used in connection with various controllers for adjusting temperature and pressure within tank 1102. For example, as shown in FIG. 11A, a temperature sensor T1102 may measure the temperature of hydrogen liquid carrier, a temperature sensor T1111 may measure the temperature of the ambient environment, a pressure sensor P1102 may measure the pressure of hydrogen liquid carrier, and controllers F1102 and G1102 may control the flow of a hydrogen liquid carrier and flow of gas respectively. In addition, a heating unit controller 1104 may control the heat transfer from heating element 1103

Figure 11B:
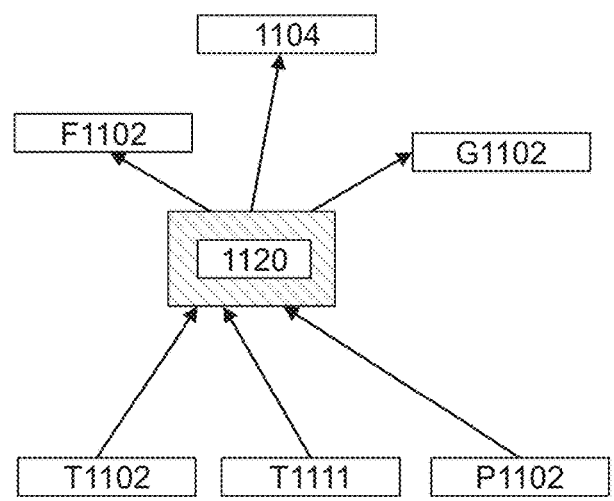
FIG. 11B is a diagram of an illustrative computer-based controller consistent with disclosed embodiments.

In an illustrative embodiment shown in FIG. 11B, a computer module 1120 associated with controlling temperature and pressure of tank 1102 may be used to process data from sensors T1102, T1111, P1102 and direct controllers F1102, G1102 and heating unit controller 1104 to affect the temperature and pressure within tank 1102 in order to maintain temperature and pressure of a hydrogen liquid carrier within a range of target values. In some embodiments, computer module 1120 may include a user-controlled interface for obtaining input from the user. For example, the user may indicate that temperature values of a hydrogen liquid carrier within fuel tank 1102 may be increased or reduced relative to the nominal values. In some embodiments, temperature and pressure values may need to be adjusted by a user, as temperature and pressure of hydrogen liquid carrier may depend on various additives to the hydrogen liquid carrier stored in tank 1102. In some embodiments, temperature and pressure of hydrogen liquid carrier may depend on the aqueous concentration of metal borohydrides. It is noted, that controllers F1102, G1102 and heating unit controller 1104 may be used concurrently or consecutively to maintain temperature and pressure of hydrogen liquid carrier within a range of target values.

In various embodiments, system 10 may be installed in a vehicle. In order to increase travel distances for the vehicle, system 20 may include or rely upon a large supply of a hydrogen liquid carrier that may be dissolved in a liquid such as water. Such a hydrogen liquid carrier may include, for example, a metal borohydride stored in a concentrated solution or in powder form. In an illustrative embodiment shown in FIG. 12A, system 20 may include a storage tank 1208 for storing a concentrated solution of a hydrogen liquid carrier 1230. Solution 1230 may be configured to be flowable and may be flowed via line 1203 into a mixing chamber 1202 that may include an expandable and contractible enclosure. System 20 may include chamber 1201 for storing spent hydrogen liquid carrier 1205 that can be delivered to chamber 1201 via inlet 115.

In various embodiments, controller 1204 may be used to control the flow from chamber 1208 into chamber 1202. In various embodiments, a chamber 1220 may store a liquid 1232 such as water. In an illustrative embodiment, liquid 1232 may flow from chamber 1220 into chamber 1202 via a conduit 1221. In various embodiments, liquid 1232 and solution 1230 may be mixed in chamber 1202 to result in an aqueous solution of a hydrogen liquid carrier from which hydrogen may be released in reaction chamber 120. In various embodiments, the amount of liquid 1232 and solution 1230 is controlled to result in an appropriate aqueous solution of the hydrogen liquid carrier.

In some embodiments, mixing elements may be included within chamber 1202 for appropriately mixing liquid 1232 and solution 1230. In some embodiments, mixing elements may include movable mixing surfaces such as movable blades. In some embodiments, mixing may be accompanied by rotation and movement of chamber 1202. In some embodiments, chamber 1202 may include internal protrusions for mixing liquid 1232 and solution 1230 during rotation and movement of chamber 1202. Various described embodiments for mixing liquid 1232 and solution 1230 are only illustrative, and various suitable mixing approaches may be used to homogenize aqueous solutions of the hydrogen liquid carrier.

Figure 12A:
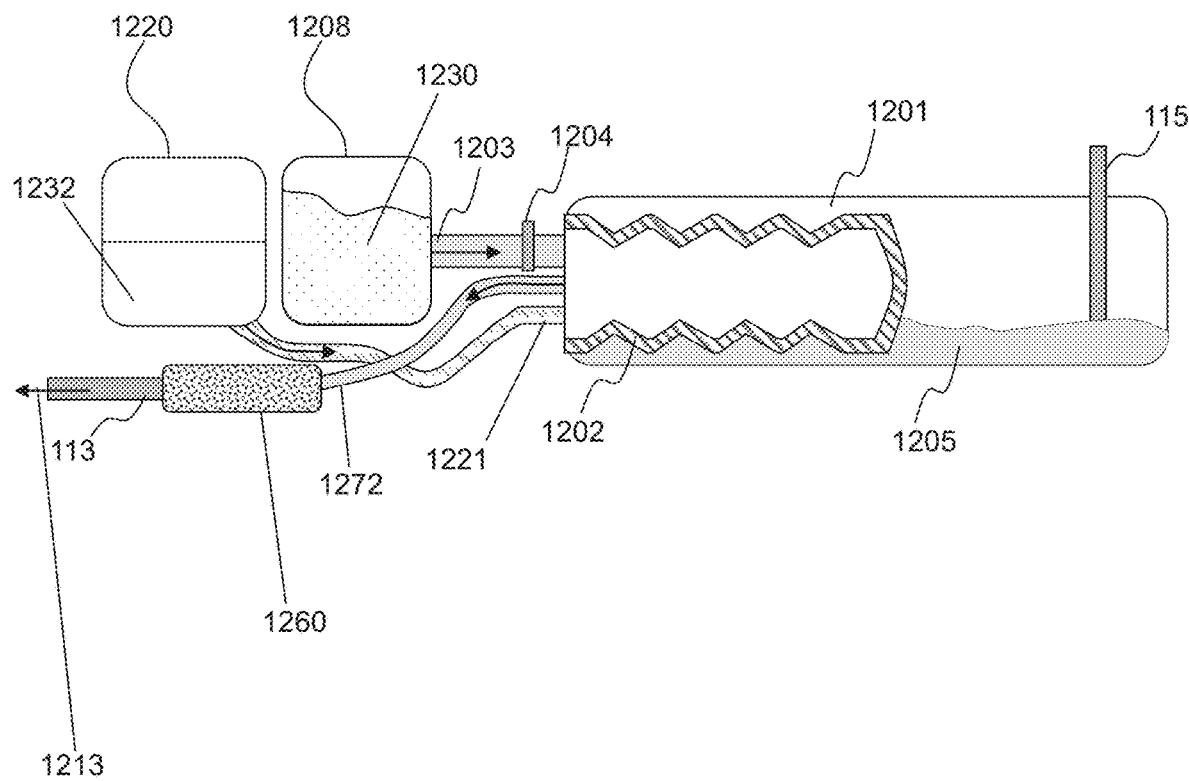
FIGS. 12A and 12B are illustrative cross-sectional views of a system for storing hydrogen liquid carrier and spent hydrogen liquid carrier consistent with disclosed embodiments.

In the illustrative embodiment shown in FIG. 12A, an aqueous solution of the hydrogen liquid carrier may be flowed via conduit 1272 to a filtering unit 1260 for filtering various components (e.g., filtering unit may filter unwanted additives and detergents, contaminants, etc. present in a hydrogen liquid carrier), prior to flowing via outlet 113 to reaction chamber 120 as indicated by arrow 1213. In various embodiments, filtering unit 1260 may include a filter block (e.g., non-woven polyolefins membranes).

Figure 12B:
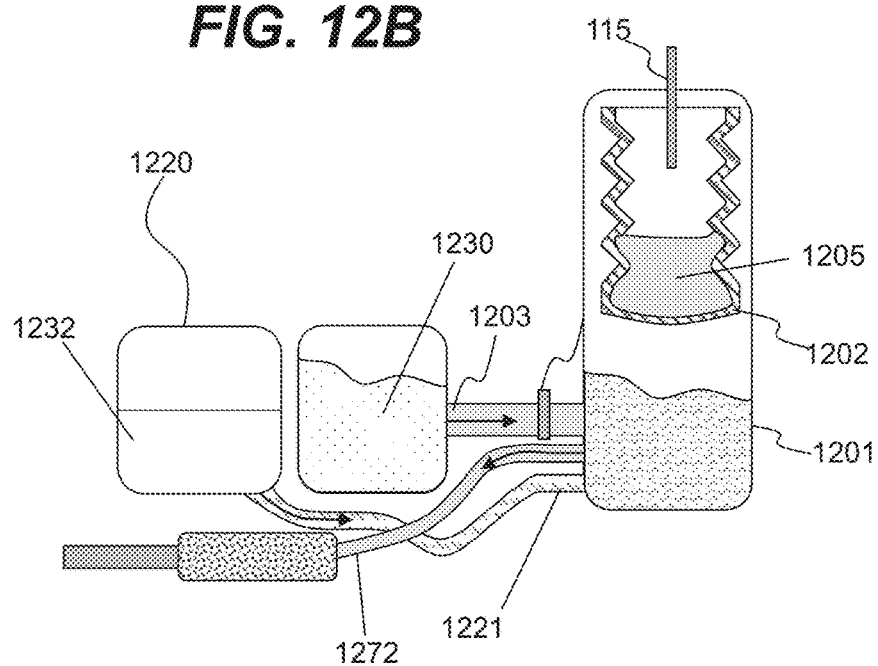

In an illustrative embodiment shown in FIG. 12B, chamber 1201 may be used as a chamber for mixing concentrated hydrogen liquid carrier 1230 and a liquid 1232 (e.g. water). Concentrated carrier 1230 may be configured to be flowable and may be flowed via line 1203 into a mixing chamber 1201 that may include elements for mixing carrier 1230 and liquid 1232. In an illustrative embodiment, liquid 1232 may flow from chamber 1220 into chamber 1201 via a conduit 1221. An aqueous solution of the hydrogen liquid carrier may flow via conduit 1272 to reaction chamber 120. As shown in FIG. 12B, system 20 may include chamber 1202 that may include an expandable and contractible enclosure. Chamber 1202 may be used for storing spent hydrogen liquid carrier 1205 that can be delivered to chamber 1202 via inlet 115.

In some embodiments, system 20 may include additional storage tanks for storing additional chemical compounds that may be used for forming solution for hydrogen liquid carrier. Such chemical compounds may include solubility-enhancing chemicals or stabilizers, such as soluble metal hydroxides, such as KOH or the like. The liquid solvent may include any liquid capable of reacting with a hydrogen-containing chemical compound (e.g., metal borohydride), and may include, but is not limited to, water. The liquid solvent may also include additives, stabilizers, or surfactant, or many others. In various embodiments, the mixture of a liquid and hydrogen containing chemical compound may result in a colloid or a suspension.

In various embodiments of system 20, several fuel tanks may be used to store various types of hydrogen liquid carriers. In an example embodiment, various types of hydrogen liquid carrier may include, such as metal borohydrides, but may have different physical and/or chemical properties. For example, system 20 may store a first and a second hydrogen liquid carrier, with the first hydrogen liquid carrier being a fast reaction fuel, and a second hydrogen liquid carrier being a high energy density fuel. The fast reaction hydrogen liquid carrier may generate hydrogen at a faster rate than the high energy density hydrogen liquid carrier. In some embodiments, fast reaction fuel may generate hydrogen at lower temperatures and pressures than the high energy density fuel. In various embodiments, the high energy density fuel may release hydrogen at a slower rate than the fast reaction fuel but may contain more hydrogen either by weight or by volume or both, than the fast reaction fuel. In some embodiments, the fast reaction fuel may be used for a startup of system 20, and for vehicle operating at high power, while the high energy density fuel may be used for vehicle operating at lower power as compared to high power values that utilize the fast reaction fuel.

Other fuels may be stored by system 20. In an example embodiment, system 20 may have one or more tanks for storing fuels for an internal combustion engine that may be present in a vehicle in addition to an electrical engine.

In various embodiments, system 20 may be configured to receive a hydrogen liquid carrier and to discharge a spent carrier. For example, when installed in a vehicle, system 20 may be configured to receive the hydrogen liquid carrier from a suitable carrier station dispenser and to discharge the spent carrier to the carrier station. In an example embodiment, system 20 may include an inlet connected to chamber 101 of fuel tank 100 for receiving the hydrogen liquid carrier from a carrier dispenser and may include an outlet connected to chamber 102 of fuel tank 100 for discharging spent carrier. In various embodiments receiving and discharging process may happen simultaneously or separately. In some embodiments, a gas (e.g., air, nitrogen or water vapor) may be supplied to either chamber 102 or chamber 101 during receiving of the carrier or dispensing of the spent carrier. In some embodiments, carrier station dispenser may be used for receiving the hydrogen liquid carrier and for dispensing the spent carrier.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A fuel tank for storing a hydrogen liquid carrier and a spent hydrogen liquid carrier, the fuel tank comprising:
   a substantially rigid exterior tank wall including a first chamber and a second chamber, the second chamber being a dynamically expandable and contractible enclosure, the enclosure being configured to define a dynamic boundary between the hydrogen liquid carrier and the spent hydrogen liquid carrier;
   a first channel in flow communication with one of the first chamber or the second chamber;
   a second channel in flow communication with another of the first chamber or the second chamber, wherein the first channel and the second channel are flow connected such that a flow through one of the first or second channels is returned to the another of the first or second channels, and that during the flow, the dynamic boundary changes position causing a change in a volume of the second chamber;
   a first controller for controlling a flow of gas into and out of the first chamber, wherein the first controller controls the flow of the gas via a channel separate from the first channel; and
   a second controller for controlling a flow of gas into and out of the second chamber, wherein the second controller controls the flow of the gas via a channel separate from the second channel.

2. The fuel tank of claim 1, wherein the first controller, is configured to cause gas to flow from the first chamber resulting in an expansion of the second chamber, and wherein the second controller, is configured to cause gas to flow into the second chamber resulting in the expansion of the second chamber.

3. The fuel tank of claim 2, wherein the flow of gas into the second chamber is configured to maintain a target pressure within the second chamber.

4. The fuel tank of claim 3, further comprising a gas channel for flowing gas into and out of the second chamber, the gas channel comprising a connection between the second chamber and an ambient environment.

5. The fuel tank of claim 1, wherein the gas includes at least one of inert gas, nitrogen, water vapor, and air.

6. The fuel tank of claim 1, wherein one of the first chamber or the second chamber is a carrier chamber configured to store the hydrogen liquid carrier, and wherein another of the first chamber or the second chamber is a spent carrier chamber configured to store the spent hydrogen liquid carrier, wherein one of the first channel or the second channel corresponding to the carrier chamber is a liquid carrier outlet, and wherein another of the first channel or the second channel corresponding to the spent carrier chamber is a spent hydrogen liquid carrier inlet.

7. The fuel tank of claim 6, wherein the carrier chamber and the liquid carrier outlet is configured to discharge the hydrogen liquid carrier from the carrier chamber.

8. The fuel tank of claim 6, further comprising a filtering unit positioned at the liquid carrier outlet.

9. The fuel tank of claim 1, wherein the hydrogen liquid carrier includes a solution containing metal-borohydride and water.

10. The fuel tank of claim 1, further comprising:
   a third chamber for storing a portion of the hydrogen liquid carrier; and
   a heating unit configured to maintain a temperature of the hydrogen liquid carrier in the third chamber within a target temperature range.

11. The fuel tank of claim 1, wherein the second chamber is detachable from the first chamber and removable.

12. The fuel tank of claim 1 wherein the second chamber is located within the first chamber and comprises an expandable cylindrical bellows.

13. The fuel tank of claim 1, wherein the second chamber comprises solid regions and foldable elastic regions.

14. The fuel tank of claim 13, wherein the foldable elastic regions include an outer protective layer, an inner chemically inert layer, and an elastic layer sandwiched between the protective and the inner chemically inert layer.

15. The fuel tank of claim 1, wherein the second chamber comprises a movable plunger.

16. The fuel tank of claim 1, wherein the inner surfaces of the second chamber comprise a chemically inert layer.

17. A system for storing a hydrogen liquid carrier and a spent hydrogen liquid carrier, the system comprising:
- a substantially rigid exterior tank wall including a first chamber and a second chamber, the second chamber being a dynamically expandable and contractible enclosure, the enclosure being configured to define a dynamic boundary between the hydrogen liquid carrier and the spent hydrogen liquid carrier, the second chamber being a dynamically expandable and contractible bladder;
- a first channel in flow communication with one of the first chamber or the second chamber;
- a second channel in flow communication with another of the first chamber or the second chamber, wherein the first channel and the second channel are flow connected such that a flow through one of the first or second channels is returned to the another of the first or second channels, and that during the flow, the dynamic boundary changes position causing a change in a volume of the second chamber;
- a first controller for controlling a flow of gas into and out of the first chamber, wherein the first controller controls the flow of the gas via a channel separate from the first channel; and
- a second controller for controlling a flow of gas into and out of the second chamber, wherein the second controller controls the flow of the gas via a channel separate from the second channel.

18. The system of claim 17, wherein the second chamber comprises a foldable material, and wherein the second chamber is configured to fold to change a volume of the second chamber.

19. A system for storing a concentrated hydrogen carrier, a liquid, and a spent hydrogen liquid carrier, the system comprising:
- a substantially rigid exterior tank wall including a first chamber and a second chamber, the second chamber being a dynamically expandable and contractible enclosure, wherein one of the first chamber or the second chamber is configured to mix the concentrated hydrogen carrier and the liquid resulting in a hydrogen liquid carrier, and wherein the enclosure is configured to define a dynamic boundary between the hydrogen liquid carrier and the spent hydrogen liquid carrier
- a first channel in flow communication with one of the first chamber or the second chamber;
- a second channel in flow communication with another of the first chamber or the second chamber, wherein the first channel and the second channel are flow connected such that a flow through one of the first or second channels is returned to the another of the first or second channels, and that during the flow, the dynamic boundary changes position causing a change in a volume of the second chamber;
- a first controller for controlling a flow of gas into and out of the first chamber, wherein the first controller controls the flow of the gas via a channel separate from the first channel; and
- a second controller for controlling a flow of gas into and out of the second chamber, wherein the second controller controls the flow of the gas via a channel separate from the second channel.

20. The system of claim 19, wherein the concentrated hydrogen carrier comprises a metal hydride stored as at least one of a concentrated liquid solution or a powder.

* * * * *